(12) United States Patent
Akar et al.

(10) Patent No.: US 12,447,239 B2
(45) Date of Patent: *Oct. 21, 2025

(54) 3D-PRINTED BIORESORBABLE ALL-POLYMER COMPOSITE SOFT TISSUE SCAFFOLDS

(71) Applicant: Northwestern University, Evanston, IL (US)

(72) Inventors: Banu Akar, Evanston, IL (US); Henry Oliver T. Ware, Evanston, IL (US); Cheng Sun, Wilmette, IL (US); Guillermo A. Ameer, Chicago, IL (US)

(73) Assignee: Northwestern University, Evanston, IL (US)

( * ) Notice: Subject to any disclaimer, the term of this patent is extended or adjusted under 35 U.S.C. 154(b) by 780 days.

This patent is subject to a terminal disclaimer.

(21) Appl. No.: 17/310,290

(22) PCT Filed: Jan. 29, 2020

(86) PCT No.: PCT/US2020/015561
§ 371 (c)(1),
(2) Date: Jul. 27, 2021

(87) PCT Pub. No.: WO2020/160077
PCT Pub. Date: Aug. 6, 2020

(65) Prior Publication Data
US 2022/0133958 A1    May 5, 2022

Related U.S. Application Data

(60) Provisional application No. 62/798,105, filed on Jan. 29, 2019.

(51) Int. Cl.
*A61L 31/04* (2006.01)
*A61L 27/26* (2006.01)
(Continued)

(52) U.S. Cl.
CPC ............ *A61L 31/041* (2013.01); *A61L 27/26* (2013.01); *A61L 27/48* (2013.01); *A61L 31/129* (2013.01);
(Continued)

(58) Field of Classification Search
CPC ........ A61L 27/26; A61L 27/48; A61L 31/041; A61L 31/129; A61L 31/18; B33Y 70/00;
(Continued)

(56) References Cited

U.S. PATENT DOCUMENTS 5,184,307 A  2/1993  Hull et al.
5,236,637 A  8/1993  Hull
(Continued)

FOREIGN PATENT DOCUMENTS

WO  WO 2016/183277     11/2016
WO  WO-2016176444 A1 * 11/2016 ............... A61F 2/82

OTHER PUBLICATIONS

International Search Report and Written Opinion for PCT/US20/15561. Mailed Apr. 24, 2020. 8 pages.
(Continued)

*Primary Examiner* — Gerard Higgins
(74) *Attorney, Agent, or Firm* — David W. Staple; Casimir Jones, S.C.

(57) ABSTRACT

Provided herein photo-reactive inks, thermal-curable materials and objects (e.g., medical implants, scaffolds, devices, etc.) made therefrom, and methods of preparation and use thereof.

18 Claims, 21 Drawing Sheets

(51) Int. Cl.
          *A61L 27/48*      (2006.01)
          *A61L 31/12*      (2006.01)
          *A61L 31/18*      (2006.01)
          *B29C 64/124*     (2017.01)
          *B33Y 10/00*      (2015.01)
          *B33Y 70/00*      (2020.01)
          *C08F 299/04*     (2006.01)
          *C08J 3/24*       (2006.01)
          *B33Y 80/00*      (2015.01)

(52) U.S. Cl.
     CPC ............ *A61L 31/18* (2013.01); *B29C 64/124* (2017.08); *B33Y 10/00* (2014.12); *B33Y 70/00* (2014.12); *C08F 299/0435* (2013.01); *C08F 299/0492* (2013.01); *C08J 3/24* (2013.01); *B33Y 80/00* (2014.12)

(58) Field of Classification Search
     CPC .. C08F 299/0435; C08F 299/0492; C08J 3/24
     See application file for complete search history.

(56) References Cited

U.S. PATENT DOCUMENTS

| | | |
|---|---|---|
| 8,404,264 B2 | 3/2013 | Ameer et al. |
| 8,568,765 B2 | 10/2013 | Ameer et al. |
| 8,580,912 B2 | 11/2013 | Ameer et al. |
| 8,758,796 B2 | 6/2014 | Ameer et al. |
| 8,772,437 B2 | 7/2014 | Ameer et al. |
| 8,911,720 B2 | 12/2014 | Ameer et al. |
| 9,360,757 B2 | 6/2016 | Desimone et al. |
| 2003/0083397 A1* | 5/2003 | Bradford ............ C09D 201/025 522/173 |
| 2003/0118692 A1 | 6/2003 | Wang et al. |
| 2009/0130162 A2 | 5/2009 | Pathak et al. |
| 2009/0149569 A1 | 6/2009 | Shastri et al. |
| 2013/0211500 A1 | 8/2013 | Kibbe et al. |
| 2014/0037588 A1 | 2/2014 | Yang et al. |
| 2014/0058049 A1 | 2/2014 | Ameer et al. |
| 2014/0135407 A1 | 5/2014 | Ameer et al. |
| 2014/0155516 A1 | 6/2014 | Ameer et al. |
| 2014/0187855 A1 | 7/2014 | Nagale et al. |
| 2018/0117219 A1* | 5/2018 | Yang ................. B29C 41/22 |
| 2018/0236122 A1 | 8/2018 | Xiao et al. |
| 2021/0008246 A1* | 1/2021 | Ameer .................. B33Y 10/00 |

OTHER PUBLICATIONS

Alexy et al., Materials and manufacturing technologies available for production of a pediatric bioabsorbable stent. Biomed Res Int. 2013;2013:137985. 11 pages.
Arshady. Preparation of biodegradable microspheres and microcapsules: 2. Polyactides and related polyesters. J. Controlled Release. 1991. 17:1-21.
Bosiers et al., Drug-eluting stents in the management of peripheral arterial disease. Vasc Health Risk Manag. 2008;4(3):553-9.
Chandy et al., Development of poly(Lactic acid)/chitosan co-matrix microspheres: controlled release of taxol-heparin for preventing restenosis. Drug Deliv. Apr.-Jun. 2001;8(2):77-86.
Chen et al., Preparation, characterization and transfection efficiency of cationic PEGylated PLA nanoparticles as gene delivery systems. J Biotechnol. Jun. 15, 2007;130(2):107-13.
Dake et al., Paclitaxel-eluting stents show superiority to balloon angioplasty and bare metal stents in femoropopliteal disease: twelve-month Zilver PTX randomized study results. Circ Cardiovasc Interv. Oct. 1, 2011;4(5):495-504.
Davaine et al., One-year clinical outcome after primary stenting for Trans-Atlantic Inter-Society Consensus (TASC) C and D femoropopliteal lesions (the STELLA "STEnting Long de L'Artère fémorale superficielle" cohort). Eur J Vasc Endovasc Surg. Oct. 2012;44(4):432-41.

Eberhart et al., Bioresorbable polymeric stents: current status and future promise. J Biomater Sci Polym Ed. 2003;14(4):299-312.
Giannatsis et al., Additive fabrication technologies applied to medicine and health care: a review. The International Journal of Advanced Manufacturing Technology, 2009. 40(1-2): 116-127.
Gogas et al., The ABSORB bioresorbable vascular scaffold: an evolution or revolution in interventional cardiology? Hellenic J Cardiol. Jul.-Aug. 2012;53(4):301-9.
Hermawan et al., Developments in metallic biodegradable stents. Acta Biomater. May 2010;6(5):1693-7.
Holland et al., Polymers for biodegradable medical devices. 1. The potential of polyesters as controlled macromolecular release systems. J. Controlled Release. 1986. 4:155-0180.
Hwang et al., Physiological transport forces govern drug distribution for stent-based delivery. Circulation. Jul. 31, 2001;104(5):600-5.
Illum et al., Polymers in Controlled Drug Delivery. Wright, Bristol, 1987. TOC only. 3 pages.
Iqbal et al., Bioresorbable scaffolds: rationale, current status, challenges, and future. Eur Heart J. Mar. 2014;35(12):765-76.
Kang et al., Biodegradable-polymer drug-eluting stents vs. bare metal stents vs. durable-polymer drug-eluting stents: a systematic review and Bayesian approach network meta-analysis. Eur Heart J. May 2014;35(17):1147-58.
Kassimis et al., Bioresorbable scaffolds in peripheral arterial disease. Expert Rev Cardiovasc Ther. Apr. 2014;12(4):443-50.
Kimble et al., Polymer Composites with Improved Properties for Potential Stent Applications. Biodegradable Polyesters. 2015. p. 299-320.
Laird et al., Nitinol stent implantation versus balloon angioplasty for lesions in the superficial femoral artery and proximal popliteal artery: twelve-month results from the RESILIENT randomized trial. Circ Cardiovasc Interv. Jun. 1, 2010;3(3):267-76.
Langeveld et al., Rat abdominal aorta stenting: a new and reliable small animal model for in-stent restenosis. J Vasc Res. Sep.-Oct. 2004;41(5):377-86.
Mahoney et al., One-year costs in patients with a history of or at risk for atherothrombosis in the United States. Circ Cardiovasc Qual Outcomes. Sep. 2008;1(1):38-45.
Manke et al., Mechanisms of nanoparticle-induced oxidative stress and toxicity. Biomed Res Int. 2013;2013:942916. 15 pages.
McNeilly et al., Soluble transition metals cause the pro-inflammatory effects of welding fumes in vitro. Toxicol Appl Pharmacol. Apr. 1, 2004;196(1):95-107.
Melchels et al., A review on stereolithography and its applications in biomedical engineering. Biomaterials. Aug. 2010;31(24):6121-30.
Mikos et al., Preparation and characterization of poly(L-lactic acid) foams. Polymer, 1994. 35: 1068-1077.
Moreno. Drug-eluting stents and other anti-restenosis devices. Rev Esp Cardiol., 2005. 58: 842-62.
Murphy et al., Supervised exercise versus primary stenting for claudication resulting from aortoiliac peripheral artery disease: six-month outcomes from the claudication: exercise versus endoluminal revascularization (CLEVER) study. Circulation. Jan. 3, 2012;125(1):130-9.
Ormiston et al., Bioabsorbable coronary stents. Circ Cardiovasc Interv. Jun. 2009;2(3):255-60.
Peuster et al., A novel approach to temporary stenting: degradable cardiovascular stents produced from corrodible metal-results 6-18 months after implantation into New Zealand white rabbits. Heart. Nov. 2001;86(5):563-9.
Photoinitiator, Wikipedia. 2009. Retrieved from the internet Mar. 27, 2020. 5 pages.
Pitt. The controlled parenteral delivery of polypeptides and proteins. Int. J. Phar. 1990. 59:173-196.
Process [Internet]. 2018 [cited Jan. 1, 2019]. Retrieved from: https://www.carbon3d.com/process/ on May 26, 2022. 15 pages.
Purnama et al., Biodegradable Metal Stents: A Focused Review on Materials and Clinical Studies. Journal of Biomaterials and Tissue Engineering. 2014. 4(11):868-874.
Radical (chemistry). Wikipedia 2016. Retrieved from the internet Mar. 27, 2020. 7 pages.

(56) References Cited

OTHER PUBLICATIONS

Radical Initiator. Wikipedia. 2007. Retrieved from the internet Mar. 27, 2020. 2 pages.

Radiocontrast agent. Wikipedia 2009. Retrieved from the internet Mar. 27, 2020. 5 pages.

Rocha-Singh et al., Performance goals and endpoint assessments for clinical trials of femoropopliteal bare nitinol stents in patients with symptomatic peripheral arterial disease. Catheter Cardiovasc Interv. May 1, 2007;69(6):910-9.

Rogers et al., Endovascular stent design dictates experimental restenosis and thrombosis. Circulation. Jun. 15, 1995;91(12):2995-3001.

Sabaté et al., Everolimus-eluting bioresorbable stent vs. durable polymer everolimus-eluting metallic stent in patients with ST-segment elevation myocardial infarction: results of the randomized ABSORB ST-segment elevation myocardial infarction-TROFI II trial. Eur Heart J. Jan. 14, 2016;37(3):229-40.

Serrano et al., Novel biodegradable shape-memory elastomers with drug-releasing capabilities. Adv Mater. May 17, 2011;23(19):2211-5.

Serruys et al., A bioresorbable everolimus-eluting scaffold versus a metallic everolimus-eluting stent for ischaemic heart disease caused by de-novo native coronary artery lesions (ABSORB II): an interim 1-year analysis of clinical and procedural secondary outcomes from a randomised controlled trial. Lancet. Jan. 3, 2015;385(9962):43-54.

Seth et al., Use of 'Guideliner' catheter to overcome failure of delivery of Absorb™ Bioresorbable Vascular Scaffold in calcified tortuous coronary lesions: technical considerations in 'Real World Patients'. Indian Heart J. Jul.-Aug. 2014;66(4):453-8.

Sing et al., Degradation behavior of biodegradable Fe35Mn alloy stents. J Biomed Mater Res B Appl Biomater. Apr. 2015;103(3):572-7.

Sun et al., Projection micro-stereolithography using digital micromirror dynamic mask. Sensors and Actuators. Physical. 2005;121(1):113-20.

Tumbleston et al., Additive manufacturing. Continuous liquid interface production of 3D objects. Science. Mar. 20, 2015;347(6228):1349-52.

Van Lith et al., 3D-Printing Strong High-Resolution Antioxidant Bioresorbable Vascular Stents. Adv Mater Technol. Dec. 2016;1(9):1600138. 7 pages.

Wang et al., Photo-crosslinked Biodegradable Elastomers for Controlled Nitric Oxide Delivery. Biomater Sci. Jun. 2013;1(6):625-632.

Wang et al., Polymer-DNA hybrid nanoparticles based on folate-polyethylenimine-block-poly(L-lactide). Bioconjug Chem. Mar.-Apr. 2005;16(2):391-6.

Ware et al., High-speed on-demand 3D printed bioresorbable vascular scaffolds. Mater Today Chem. 2018;7:25-34.

Ware et al., Process development for high-resolution 3D-printing of bioresorbable vascular stents. SPIE Proceedings. 2017. p. 101150N. 12 pages.

Webb et al., Biodegradable poly(diol citrate) nanocomposite elastomers for soft tissue engineering. J Mater Chem. 2007;17(9):900-6.

Yang et al., A thermoresponsive biodegradable polymer with intrinsic antioxidant properties. Biomacromolecules. Nov. 10, 2014;15(11):3942-52.

Yang et al., Synthesis and evaluation of poly(diol citrate) biodegradable elastomers. Biomaterials. Mar. 2006;27(9):1889-98.

Zartner et al., First biodegradable metal stent in a child with congenital heart disease: evaluation of macro and histopathology. Catheter Cardiovasc Interv. Feb. 15, 2007;69(3):443-6.

\* cited by examiner

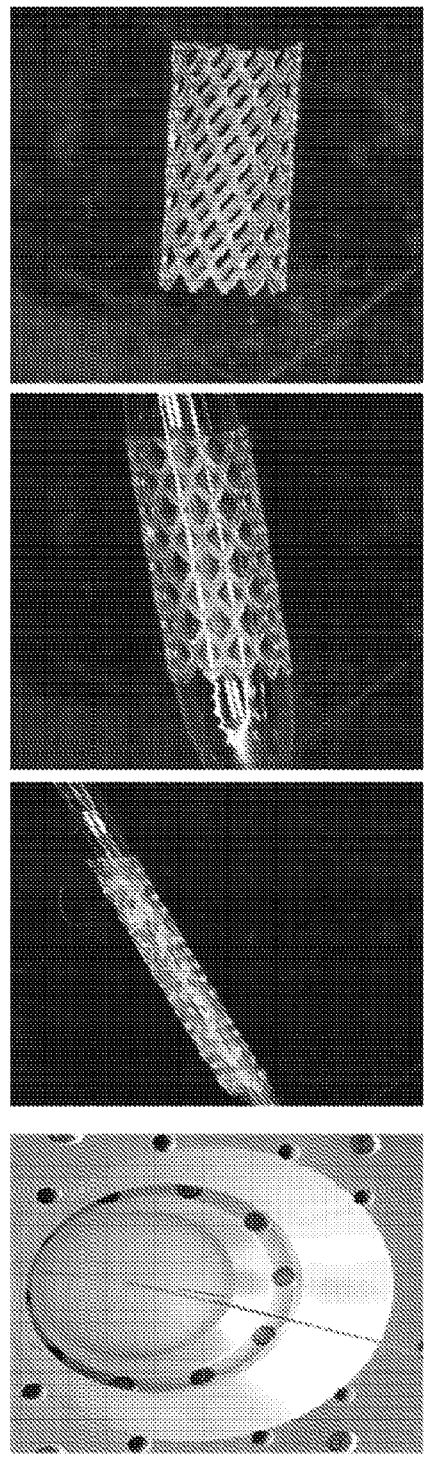

3D-PRINTED BIORESORBABLE ALL-POLYMER COMPOSITE SOFT TISSUE SCAFFOLDS

CROSS-REFERENCE TO RELATED APPLICATIONS

This application claims the benefit of U.S. Provisional Patent Application No. 62/798,105, filed on Jan. 29, 2019, which is incorporated by reference herein.

FIELD

Provided herein photo-reactive inks, thermal-curable materials and objects (e.g., medical implants, scaffolds, devices, etc.) made therefrom, and methods of preparation and use thereof.

BACKGROUND

Atherosclerotic coronary artery disease (CAD) and peripheral artery disease (PAD) are responsible for significant morbidity, mortality, and high healthcare costs in the United States.[2-4] Endovascular therapies such as balloon angioplasty with or without the placement of a stent can reduce the symptoms and improve the quality of life of patients; however, restenosis rates remain unacceptably high.[5-9] To address this problem, researchers have been focused on developing stents that will promote the healthy remodeling and regeneration of the blood vessel wall after angioplasty. The most prevalent stents used today are drug-eluting metal stents (DES), which have shown some benefits relative to bare metal stents regarding early incidences of restenosis.[10,11] However, metal DES have a higher risk of late stent thrombosis, requiring antiplatelet therapies that complicate the care of a large percentage of patients that receive these stents.[12,13] Problems associated with bare metal and drug-eluting metal stents have prompted the development of bioresorbable stents (BRS) or bioresorbable vascular scaffolds (BVS). These devices may be made from metals or polymers. Metal-based BVSs are mostly fabricated from magnesium and iron and have not been clinically adopted to date due to their rapid resorption, which leads to frequent post-surgical restenosis.[14-21] Polymer-based BVSs such as Abbott's ABSORB™[22] allow for the temporary release of a drug that inhibits intimal hyperplasia (IH), are eventually resorbed by the body, and are believed to potentially restore natural vasomotion following stent resorption, all of which are properties that are expected to increase long-term vessel patency.[11] Although the development and use of BVS in humans is a major breakthrough for endovascular therapies, clinical studies to date have not demonstrated superiority of BVS when compared to commonly used metal DES.[1,22] The current fabrication method used for BVS results in strut dimensions that are 2-3 times larger than those of bare metal stents.[23-26] Furthermore, polymer-based BVSs cannot be visualized using standard clinical imaging techniques, requiring the placement of small metal markers at the beginning and end of the device so that the surgeon can track the location of the implanted stent.

3D printing, also known as additive manufacturing (AM), is a term used to describe several different processes that builds a user-designed CAD part layer-by-layer until completion (Giannatsis, J. and V. Dedoussis, *The International Journal of Advanced Manufacturing Technology*, 40(1-2): 116-127 (2009)). These processes include photo-polymerization methods, extrusion-based methods, laser-induced melting/sintering, etc. 3D printing techniques give the designer geometric flexibility that is troublesome for standard subtractive manufacturing processes (Giannatsis, J. and V. Dedoussis, *The International Journal of Advanced Manufacturing Technology*, 40(1-2): 116-127 (2009); Melchels et al., *Biomaterials*, 31(24): 6121-6130 (2010)). 3D printing has typically been used for small batch manufacturing, such as prototype manufacturing and biomedicine for patient specific needs.

Continuous liquid interface processing (CLIP) is an additive manufacturing process that utilizes photopolymerization to create 3D geometric parts. CLIP could be considered a 3rd generation of stereolithography AM process. Projection stereolithography (PSL; stereolithography 2nd generation) utilizes patterning the UV light via a dynamic mask generator to allow fabrication of each cross-sectional layer in a single exposure (Sun et al., *Sensors and Actuators A: Physical*, 121(1): 113-120 (2005)). In-plane resolution of PSL is dependent on the pixel size of the dynamic mask generator. In the case of projection microstereolithography (PμSL), in-plane resolution can be sub-20 μm. With an emphasis on high precision and surface finish, a high resolution microCLIP process has recently been developed (van Lith, et al. *3D-Printing Strong High Resolution Antioxidant Bioresorbable Vascular Stents*). Advanced Materials Technologies, 2016). CLIP/microCLIP works in a similar manner to PSL with the addition of an air/oxygen permeable window placed between the UV light optics and the photopolymer resin. Oxygen is a natural inhibitor of the photopolymerization reaction. With introduction of oxygen permeable window into the UV light pathway allows a small region where no polymerization occurs (Tumbleston et al., *Science*, 347 (6228): 1349-1352 (2015)). This allows removal of a "delamination" step during fabrication (removing polymerized layer from optical window). In addition, this small polymerization-free region allows new photoresin to flow in and replace polymerized material, allowing essentially continuous fabrication of each layer onto the previous layer until the part is complete. CLIP/microCLIP has caused a massive reduction in fabrication time within the stereolithography processes, which typically range from several hours to now several minutes (van Lith et al., supra, and Tumbleston et al., supra). This process has opened the door to newer materials that may have been troublesome to utilize in previous stereolithography techniques, such as very viscous materials or materials that need quickly evaporating solvents.

There remains a need for compositions and methods for producing imaging-compatible, lower-profile bioresorbable vascular scaffolds. This disclosure provides such compositions and methods.

SUMMARY

Provided herein are photo-reactive inks, thermal-curable materials and objects (e.g., medical implants, scaffolds, devices, etc.) made therefrom, and methods of preparation and use thereof.

In some embodiments, provided herein are compositions comprising: (a) an acrylated or methacrylated polymer; (b) a photoinitiator compound, wherein exposure to light of an appropriate wavelength results in formation of a first reactive species from the photoinitiator compound; (c) a thermal initiator compound, wherein exposure to heat results in formation of a second reactive species from the thermal initiator compound; (d) a poly(L) lactic acid (PLLA); and (e) a contrast agent. In some embodiments, the first reactive species and/or second reactive species is a free radical. In some embodiments, the appropriate wavelength of light is in the UV range (e.g., 10-400 nm (e.g., 10 nm, 20 nm, 40 nm, 60 nm, 80 nm, 100 nm, 120 nm, 140 nm, 160 nm, 180 nm, 200 nm, 220 nm, 240 nm, 260 nm, 280 nm, 300 nm, 320 nm, 340 nm, 360 nm, 380 nm, 400 nm, or ranges therebetween)). In some embodiments, exposure to heat comprises increasing temperature above a threshold temperature. In some embodiments, exposure to heat comprises exposure to physiologic temperatures (e.g., 34-40° C. (e.g., about 37° C.)).

In some embodiments, the PLLA is dissolved in a solvent (e.g., tetrahydrofuran). In some embodiments, the contrast agent is a radiocontrast agent, such as iodixanol. In some embodiments, compositions further comprise a solvent (e.g., water, ethanol, methanol, etc.). In some embodiments, the composition is a liquid. In some embodiments, the composition is an ink suitable for photoinitiated 3D printing. In some embodiments, exposure of the composition to light of an appropriate wavelength results in crosslinking of the acrylated or methacrylated polymer, induced by the photoinitiator, to form a malleable solid material. In some embodiments, exposure of the malleable solid material to heat results in curing of the malleable solid material, induced by the thermal initiator, to form a thermoset material.

In some embodiments, the acrylated or methacrylated polymer is a biodegradeable and/or biocompatible polyester. In some embodiments, the acrylated or methacrylated polymer is a citric acid-based polyester. In some embodiments, the citric acid-based polyester comprises of polymer of citric acid and linear aliphatic diol monomers. In some embodiments, the citric acid-based polyester comprises a poly(diol citrate). In some embodiments, the diol is a linear aliphatic diol, X carbons in length, wherein X is between 2 and 20, and comprising OH groups on the 1 and X carbons. In some embodiments, the diol is selected from the group consisting of 1,4-butanediol, 1,6-hexanediol, 1,8-octanediol, 1,10-decanediol, 1,12-dodecanediol, 1,14-quattuordecanediol, and 1,16-sedecimanediol. In some embodiments, at least 10% of the citric acid monomers of the acrylated or methacrylated polymer display a methacrylate or acrylate (e.g., 10%, 20%, 30%, 40%, 50%, 60%, 70%, 80%, 90%, 95%, 99%, or more or ranges therebetween (e.g., 50-90%, 90% or more, etc.).

In some embodiments, the photoinitiator comprises a compound selected from the group consisting of benzoyl peroxide, 2,2-Dimethoxy-2-phenylacetophenone (DMPA), camphorquinone (CQ), phenylbis(2,4,6-trimethylbenzoyl) phosphine oxide (BAPO), 2-Hydroxy-2-methylpropiophenone, ethyl 4-dimethylaminobenzoate (EDAB), and 2-hydroxy-4'-(2-hydroxyethoxy)-2-methylpropiophenone.

In some embodiments, the thermoresponsive initiator is a diazo compound. In some embodiments, the thermoresponsive initiator is selected from the group consisting of V-65, V-70, V-40, V-50, V-59, VA-044, VA-057, VA-061, VA-086, azobisisobutyronitrile (AIBN), and BPO.

In some embodiments, provided herein are objects (e.g., medical implant, medical device, cell scaffold, etc.) generated by photoinitiated 3D printing using the compositions (e.g., 3D printing inks) described herein.

In some embodiments, provided herein are thermoset objects (e.g., medical implant, medical device, cell scaffold, etc.) and/or materials generated by thermally-induced curing of the malleable solid materials object and/or materials (e.g., produced by photoinitiated 3D printing using the inks described herein).

In some embodiments, provided herein are methods of promoting blood vessel regeneration at a defect site in a subject comprising: (a) placing at the defect site a malleable solid implant generated by photoinitiated 3D printing using a composition described herein as an ink; and (b) allowing the implant to undergo thermally-induced curing within the subject to form a thermoset implant at the defect site. In some embodiments, methods further comprise exposure to UV light or incubation at elevated temperature prior to placing the malleable solid implant at the defect site. In some embodiments, pre-exposure to UV light or incubation at elevated temperature initiates but does not complete the formation of the thermoset implant prior to implantation. In some embodiments, the elevated temperature is 30-50° C. (e.g., 30° C., 35° C., 40° C., 45° C., 50° C., or ranges therebetween). In some embodiments, the implant is visualized at the defect cite (e.g., via computer tomography (CT); Magnetic Resonance Imaging (MRI), ultrasound, or X-ray).

In some embodiments, provided herein are methods of stereolithographically printing a 3D object comprising: (a) depositing a layer of a ink described herein (e.g., comprising an acrylated or methacrylated polymer, a photoinitiator, a thermal initiator, a PLLA, and a contrast agent); (b) exposing the layer to light of the appropriate wavelength to form the first reactive species from the photoinitiator, wherein the first reactive species induces crosslinking of the acrylated or methacrylated polymer to form a malleable solid material; (c) depositing an additional layer of the ink atop the previous layer; (d) exposing the additional layer to light of the appropriate wavelength to form the first reactive species from the photoinitiator, wherein the first reactive species induces crosslinking of the acrylated or methacrylated polymer to form a malleable solid material; and (e) repeating steps (c) and (d) a sufficient number of times (e.g., 5, 10, 20, 30, 40, 50, 60, 70, 80, 90, 100, 150, 200, 250, 300, 400, 500, 600, 700, 800, 900, 1000, or more) to form the 3D object. In some embodiments, the depositing and exposing steps are performed by continuous liquid interface processing (CLIP), microsterolithography, or microCLIP. In some embodiments, provided herein are objects (e.g., medical implant, medical device, cell scaffold, etc.) produced by the stereolithographic printing methods described herein.

In some embodiments, provided herein are methods of curing a malleable solid object described herein into a fixed shape, position, and/or orientation, comprising: (a) manipulating the object into a desired shape, position, and/or orientation; and (b) exposing the object to sufficient heat to form the second reactive species from the thermal initiator, wherein the second reactive species induces curing of the malleable solid material to fix the object into the desired shape, position, and/or orientation. In some embodiments, the object is a medical implant or medical device, wherein manipulating the object comprising implanting the device into a subject, and wherein the sufficient heat is physiologic temperature of the subject. In some embodiments, provided herein are objects (e.g., medical implant, medical device, cell scaffold, etc.) fixed by the curing methods described herein.

In some embodiments, provided herein is the use of the compositions, methods, objects, etc. described herein in a medical procedure (e.g., implanting a medical implant, medical device, cell scaffold, etc. into a subject and fixing its shape, orientation, and/or position).

BRIEF DESCRIPTION OF THE FIGURES

FIG. 2A shows 3D microCT reconstructions of BVS with various mass percentages of iodixanol. FIG. 2B shows BVSs implanted in chicken legs. FIG. 2C is an X-ray image of the implanted stents shown in FIG. 2B.

FIGS. 4A-4D are images showing, from left to right, the crimping of and balloon expansion process for the BVS.

DEFINITIONS

Figure 1:
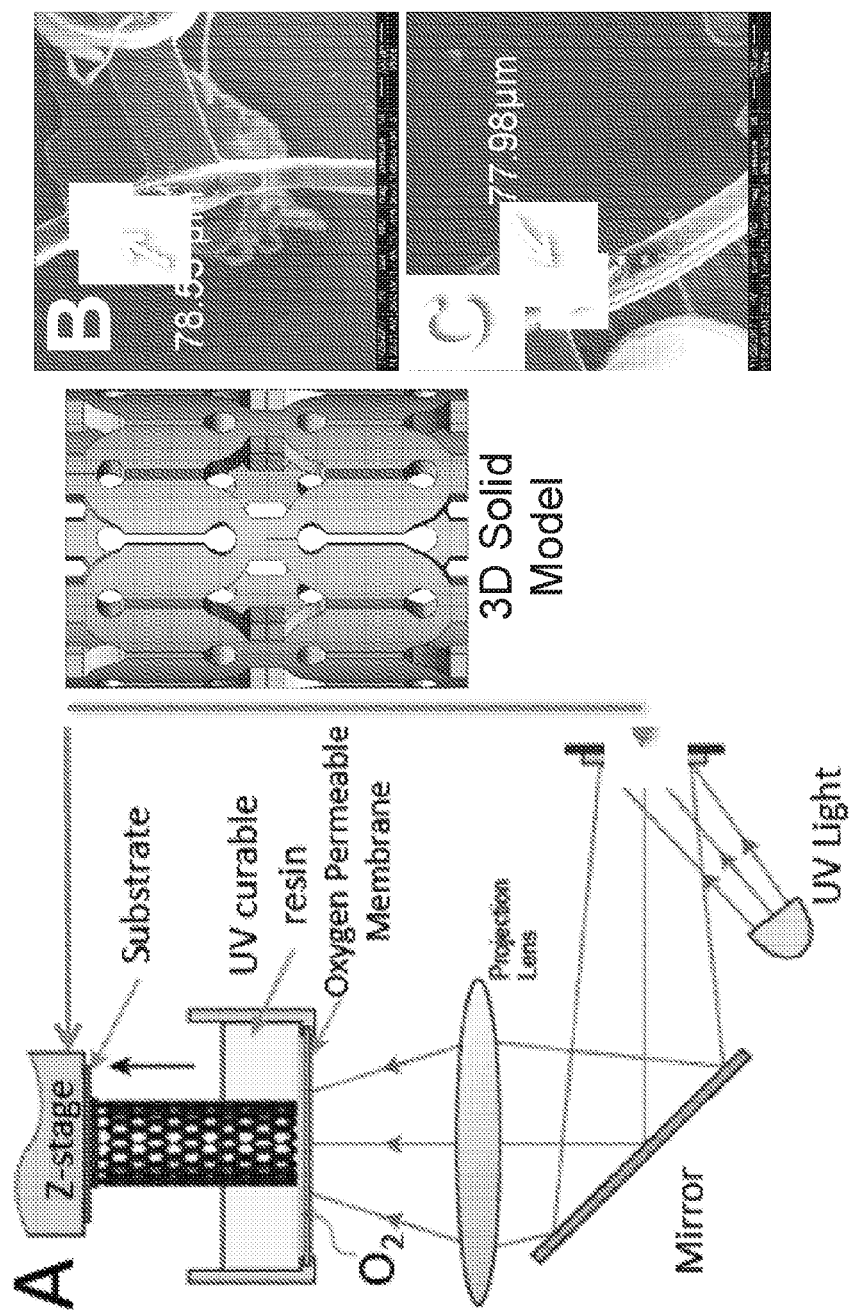
FIG. 1A is a schematic illustration of the μCLIP process. The 3D solid model is used to simultaneously control the display on dynamic mask and the continued motion of the substrate for rapid fabrication of 3D parts.
FIGS. 1B and 1C are scanning electron microscopy (SEM) images of printed BVSs with struts thickness that are under 100 μm.

Although any methods and materials similar or equivalent to those described herein can be used in the practice or testing of embodiments described herein, some preferred methods, compositions, devices, and materials are described herein. However, before the present materials and methods are described, it is to be understood that this invention is not limited to the particular molecules, compositions, methodologies or protocols herein described, as these may vary in accordance with routine experimentation and optimization. It is also to be understood that the terminology used in the description is for the purpose of describing the particular versions or embodiments only, and is not intended to limit the scope of the embodiments described herein.

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein and in the appended claims, the singular forms "a," "an," and "the" include plural reference unless the context clearly dictates otherwise. Thus, for example, reference to "a polymer" is a reference to one or more polymers and equivalents thereof known to those skilled in the art, and so forth.

As used herein, the term "and/or" includes any and all combinations of listed items, including any of the listed items individually. For example, "A, B, and/or C" encompasses A, B, C, AB, AC, BC, and ABC, each of which is to be considered separately described by the statement "A, B, and/or C." As used herein, the term "comprise" and linguistic variations thereof denote the presence of recited feature(s), element(s), method step(s), etc. without the exclusion of the presence of additional feature(s), element(s), method step(s), etc. Conversely, the term "consisting of" and linguistic variations thereof, denotes the presence of recited feature(s), element(s), method step(s), etc. and excludes any unrecited feature(s), element(s), method step(s), etc., except for ordinarily-associated impurities. The phrase "consisting essentially of" denotes the recited feature(s), element(s), method step(s), etc. and any additional feature(s), element(s), method step(s), etc. that do not materially affect the basic nature of the composition, system, or method. Many embodiments herein are described using open "comprising" language. Such embodiments encompass multiple closed "consisting of" and/or "consisting essentially of" embodiments, which may alternatively be claimed or described using such language.

As used herein, the term "substantially all," "substantially complete" and similar terms refer to greater than 99%; and the terms "substantially none," "substantially free of," and similar terms refer to less than 1%.

The term "about" allows for a degree of variability in a value or range. As used herein, the term "about: refers to values within 10% of the recited value or range (e.g., about 50 is the equivalent of 45-55).

As used herein, the term "polymer" refers to a chain of repeating structural units or "monomers," typically of large molecular mass. Examples of polymers include homopolymers (single type of monomer subunits), copolymers (two types of monomer subunits), and heteropolymers (e.g., three or more types of monomer subunits). As used herein, the term "oligomer" refers to a polymer of only a few monomer units (e.g., 2, 3, 4, 5, or more) up to about 50 monomer units, for example a dimer, trimer, tetramer, pentamer, hexamer . . . decamer, etc.

As used herein, the term "linear polymer" refers to a polymer in which the molecules form long chains without branches or crosslinked structures.

As used herein, the term "branched polymer" refers to a polymer comprising a polymer backbone with one or more additional monomers, or chains or monomers, extending from a polymer backbone. The degree of interconnectedness of the "branches" is insufficient to render the polymer insoluble.

As used herein, the term "pre-polymer" refers to linear or branched polymers (e.g., not significantly crosslinked) that have the capacity to be crosslinked under appropriate conditions (e.g., to "cure" and/or form a thermoset or hydrogel) but have not been subjected to the appropriate conditions.

As used herein, the term "crosslinked polymer" refers to a polymer with a significant degree of interconnectedness between multiple polymer strands, the result of which is an insoluble polymer network. For example, multiple polymer strands may be crosslinked to each other at points within their structures, not limited to the ends of the polymer chains.

As used here, the terms "thermoset polymer" and "cured polymer" refer to a polymer network that exhibits a sufficient degree of covalent crosslinking to render the network insoluble (e.g., in both water and organic solvents) and infusible. "Thermosetting" and/or "curing" may be achieved by thermal (e.g., heating), radiation (e.g., UV crosslinking), or chemical (e.g., chemically-induced crosslinking) means. The thermosetting/curing procedure is not reversible, except by means of chemically breaking the covalent crosslinks.

As used herein, the terms "composite" and "composite material" refer to materials or compositions generated from the combination of two or more constituent materials (e.g., compounds, polymers, etc.). The constituent materials may interact (e.g., non-covalently) at the microscopic or molecular level, but typically do not react chemically (e.g., covalently). At the macroscopic level, the constituent materials typically appear homogenous but may appear separate or distinct.

As used herein, the term "nanoparticles" refers to particles having mean dimensions (e.g., diameter, width, length, etc.) of less than 1 μm (e.g., <500 nm ("sub-500-nm nanoparticles"), <100 nm ("sub-100-nm nanoparticles"), <50 nm ("sub-50-nm nanoparticles"). Nanoparticles may be of any shape and may be two or three dimensional.

As used herein, the term "biocompatible" refers to materials, compounds, or compositions means that do not cause or elicit significant adverse effects when administered to a subject. Examples of possible adverse effects that limit biocompatibility include, but are not limited to, excessive inflammation, excessive or adverse immune response, and toxicity.

As used herein, the term "biostable" refers to compositions or materials that do not readily break-down or degrade in a physiological or similar aqueous environment. Conversely, the term "biodegradeable" refers herein to compositions or materials that readily decompose (e.g., depolymerize, hydrolyze, are enzymatically degraded, disassociate, etc.) in a physiological or other environment.

As used herein, the term "acrylated" refers to a compound displaying at least one moiety/substituent having the structure:

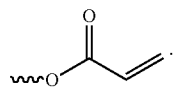

The displayed moiety is referred to as an "acrylate moiety".

As used herein, the term "methacrylteacrylated" refers to a compound displaying at least one moiety/substituent having the structure:

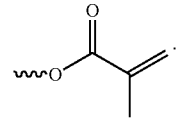

The displayed moiety is referred to as an "methacrylate moiety".

As used herein, the term "stereolithography" refers to an additive manufacturing process wherein a three-dimensional (3D) object is fabricated by depositing and hardening (e.g., polymerizing) successive layers of material in a stepwise layer-by-layer fashion. As described in U.S. Pat. No. 5,184,307, a stereolithography system will typically form a three-dimensional object in accordance with a corresponding object representation, which may be formed in a computer-aided design (CAD) system or the like. The object representation is divided into a plurality of layer representations that a stereolithography system will, in the course of building up the object in a stepwise, layer-by-layer manner, to form the physical object layers, and thus, the 3D object itself.

As used herein the term "photoinitiator" refers to a compound that undergoes a reaction (e.g., decomposition) upon absorption of light within a particular range of wavelengths, producing a reactive species (e.g., radical) that can initiate reactions (e.g., polymerization, crosslinking, etc.) of other molecules. Examples of photoinitiators include azo-bisisobutyronitrile (AIBN), benzoyl peroxide, 2,2-dimethoxy-2-phenylacetophenone (DMPA), camphorquinone (CQ), phenylbis(2,4,6-trimethylbenzoyl)phosphine oxide (BAPO), 2-hydroxy-2-methylpropiophenone (DAROCUR), ethyl 4-dimethylaminobenzoate (EDAB), and 2-hydroxy-4'-(2-hydroxyethoxy)-2-methylpropiophenone (IRGACURE).

As used herein, the term "photopolymerization" refers to a polymerization reaction that is initiated by exposure of monomers and/or a photoinitiator to light.

As used herein, the term "photocrosslinking" refers to a crosslinking reaction that is initiated by exposure of macromolecules (e.g., polymers) and/or a photoinitiator to light.

As used herein the term "thermal initiator" refers to a compound that undergoes a reaction (e.g., decomposition) upon exposure to heat (e.g., a temperature above a particular threshold), producing reactive species (e.g., radical) that can initiate reactions (e.g., polymerization, crosslinking, etc.) of other molecules.

As used herein, the terms "thermal curing" and "thermal-induced crosslinking" refer to a curing and/or crosslinking reaction that is initiated by exposure of macromolecules (e.g., polymers) and/or a thermal initiator to heat (e.g., a temperature above a particular threshold).

As used herein, the term "malleable" refers to a material, object, device, etc. which is capable of being manipulated to some extent into a desired shape, position, and/or orientation, and which retains this manipulated shape, position, or orientation under the typical stresses and strains applied when used for an intended purpose, for example within a patient (i.e., not rigid).

As used herein, the term "rigid" refers to a material, object, device, etc. which maintains its shape, position, and/or or orientation under the typical stresses and strains applied when used for an intended purpose, for example within a patient (i.e., not malleable).

As used herein, the term "microstructure" refers to structural features, such as pores, recesses, ridges, etc., that have one or more dimensions (e.g., height, width, length, and/or diameter) that are less than 1 mm, but 1 μm or greater in length.

DETAILED DESCRIPTION

Provided herein photo-reactive inks, thermal-curable materials and objects (e.g., medical implants, scaffolds, devices, etc.) made therefrom, and methods of preparation and use thereof.

In some embodiments, objects described herein are made from citrate-based polymer materials and/or composites. In some embodiments, two-step methods, comprising a first photocrosslinking step and a second thermal curing step are provided. In particular embodiments, object, devices, implants, scaffolds, etc. described herein have initial elastic mechanical properties (e.g., malleable solids), which facilitates placement within a subject; however, upon implantation, due to body temperature, the material gradually hardens into a more rigid state. The compositions and methods herein find use, for example, in blood vessel regeneration.

In some embodiments, polymers that find use as the curable component in the compositions and composites described herein display one or more reactive moieties (e.g., acrylate moiety, methacrylate moiety, etc). In some embodiments, the reactive moieties are stable in the absence of an initiator compound (e.g., diazo initiator, (e.g., V70, VA-044, etc.)). In some embodiments, the reactive moieties are stable in the absence of initiation conditions (e.g., temperatures over 25° C. (e.g., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., or more), etc.).

In some embodiments, reactive polymers are acrylated polymers. In some embodiments, acrylated polymers display one or more acrylate substituents. In some embodiments, an acrylate substituent is an alkyl acrylate. Examples of alkyl acrylates include methyl acrylate, ethyl acrylate, n-propyl acrylate, isopropyl acrylate, n-butyl acrylate, sec-butyl acrylate, tert-butyl acrylate, lauryl acrylate, cyclohexyl acrylate, dicyclopentenyl acrylate and the like alone or mixtures thereof. In some embodiments, suitable polymers are acrylated by reaction between the polymer and an acrylate compound displaying a suitable moiety (e.g., epoxide moiety) for covalent attachment of the acrylate to one or more positions on the polymer. In some embodiments, glycidyl acrylate is employed to acrylate reactive positions (e.g., hydroxyl, carboxylic acids, etc.) on polymers. In some embodiments, each monomer of a polymer is acrylated. In some embodiments, each occurrence of a particular monomer in a polymer is acrylated (e.g., in a copolymer). In some embodiments, reaction of the acrylate compound (e.g., glycidyl acrylate) with a polymer is controlled (e.g., molar ratio of acrylate to polymer (e.g., 100:1, 90:1, 80:1, 70:1, 60:1, 50:1, 40:1, 30:1, 20:1, 10:1, 9:1, 8:1, 7:1, 6:1, 5:1, 4:1, 3:1, 2:1, 1:1, 2:1, 3:1, 4:1, 5:1, 6:1, 7:1, 8:1, 9:1, 10:1, 20:1, 30:1, 40:1, 50:1, 60:1, 70:1, 80:1, 90:1,100:1, or ranges therebetween), reaction conditions, reaction time, etc.) to limit the percentage of monomers that are acrylated (e.g., %, 2%, 3%, 4%, 5%, 6%, 7%, 8%, 9%, 10%, 15%, 20%, 25%, 30%, 40%, 50%, 60%, 70%, 80%, 90%, or ranges therebetween). In some embodiments, acrylated polymers crosslink and/or cure (e.g., crosslink with each other, transition from liquid and/or soluble to solid and/or insoluble) under appropriate conditions (e.g., in the presence of UV light or at a particular temperature) and in the presence of an initiator compound (e.g., photoinitiator, thermal initiator, etc.).

In some embodiments, reactive polymers are methacrylated polymers. In some embodiments, methacrylated polymers display one or more methacrylate substituents. In some embodiments, a methacrylate substituent is an alkyl methacrylate. Examples of alkyl methacrylates include methyl methacrylate, ethyl methacrylate, n-propyl methacrylate, isopropyl methacrylate, n-butyl methacrylate, sec-butyl methacrylate, tert-butyl methacrylate, lauryl methacrylate, cyclohexyl methacrylate, dicyclopentenyl methacrylate and the like alone or mixtures thereof. In some embodiments, suitable polymers are methacrylated by reaction between the polymer and a methacrylate compound displaying a suitable moiety (e.g., epoxide moiety) for covalent attachment of the methacrylate to one or more positions on the polymer. In some embodiments, glycidyl methacrylate is employed to methacrylate reactive positions (e.g., hydroxyl, carboxylic acids, etc.) on polymers. In some embodiments, each monomer of a polymer is methacrylated. In some embodiments, each occurrence of a particular monomer in a polymer is methacrylated (e.g., in a copolymer). In some embodiments, reaction of the methacrylate compound (e.g., glycidyl methacrylate) with a polymer is controlled (e.g., molar ratio of acrylate to polymer (e.g., 100:1, 90:1, 80:1, 70:1, 60:1, 50:1, 40:1, 30:1, 20:1, 10:1, 9:1, 8:1, 7:1, 6:1, 5:1, 4:1, 3:1, 2:1, 1:1, 2:1, 3:1, 4:1, 5:1, 6:1, 7:1, 8:1, 9:1, 10:1, 20:1, 30:1, 40:1, 50:1, 60:1, 70:1, 80:1, 90:1,100:1, or ranges therebetween), reaction conditions, reaction time, etc.) to limit the percentage of monomers and/or potentially-methacrylatable monomers in a polymer that are methacrylated (e.g., 1%, 2%, 3%, 4%, 5%, 6%, 7%, 8%, 9%, 10%, 15%, 20%, 25%, 30%, 40%, 50%, 60%, 70%, 80%, 90%, or ranges therebetween). In some embodiments, methacrylated polymers crosslink and/or cure (e.g., crosslink with each other, transition from liquid and/or soluble to solid and/or insoluble) under appropriate conditions (e.g., in the presence of UV light or at a particular temperature) and in the presence of an initiator compound (e.g., photoinitiator, thermal initiator, etc.).

In some embodiments, any polymer (or monomer thereof) displaying suitably reactive substituents may find use in embodiments herein. For example, any suitable polymer (or monomer thereof) may be acrylated and/or methacrylated (e.g., as described above and/or in the examples) to produce a reactive polymer that finds use in embodiments herein. For example, suitable polymers include, but are not limited to: collagen, elastin, hyaluronic acid and derivatives, sodium alginate and derivatives, chitosan and derivatives gelatin, starch, cellulose polymers (for example methylcellulose, hydroxypropylcellulose, hydroxypropylmethylcellulose, carboxymethylcellulose, cellulose acetate phthalate, cellulose acetate succinate, hydroxypropylmethylcellulose phthalate), poly(diol citrate) (e.g., poly(hexanediol citrate), poly (octanediol citrate), poly(decanediol citrate), poly (dodecanediol citrate), etc.), casein, dextran and derivatives, polysaccharides, poly(caprolactone), fibrinogen, poly(hydroxyl acids), poly(L-lactide) poly(D,L lactide), poly(D,L-lactide-co-glycolide), poly(L-lactide-co-glycolide), copolymers of lactic acid and glycolic acid, copolymers of ε-caprolactone and lactide, copolymers of glycolide and ε-caprolactone, copolymers of lactide and 1,4-dioxane-2-one, polymers and copolymers that include one or more of the residue units of the monomers D-lactide, L-lactide, D,L-lactide, glycolide, ε-caprolactone, trimethylene carbonate, 1,4-dioxane-2-one or 1,5-dioxepan-2-one, poly(glycolide), poly(hydroxybutyrate), poly(alkylcarbonate) and poly(orthoesters), polyesters, poly(hydroxyvaleric acid), polydioxanone, poly(ethylene terephthalate), poly(malic acid), poly(tartronic acid), polyanhydrides, polyphosphazenes, poly(amino acids), polyethylene, acrylic resins, polyurethane, polypropylene, polymethylmethacrylate, and copolymers of the above polymers as well as blends and combinations of the above polymers. (See generally, Illum, L., Davids, S. S. (eds.) "Polymers in Controlled Drug Delivery" Wright, Bristol, 1987; Arshady, J. Controlled Release 17:1-22, 1991; Pitt, Int. J. Phar. 59:173-196, 1990; Holland et al., J. Controlled Release 4:155-0180, 1986; herein incorporated by reference in their entireties). In some embodiments, any of the aforementioned polymers, when modified to display one or more reactive groups (e.g., acrylate, methacrylate, etc.) may find use at the reactive polymer component of materials described herein.

In some embodiments, reactive polymers are citric acid-based polymers. Citric acid is a reactive tricarboxylic acid that is part of the Krebs cycle and has been used as a key reactant monomer for the synthesis of polydiolcitrates with a wide range of properties and uses (Yang, J., et al., Synthesis and evaluation of poly(diol citrate) biodegradable elastomers. Biomaterials, 2006. 27 (9): p. 1889-98; U.S. Pat. Nos. 8,772,437; 8,758,796; 8,580,912; 8,568,765; U.S. Pub. No. 2014/0155516; U.S. Pub. No. 2014/0135407; herein incorporated by reference in their entireties). Depending on the diol of choice, materials with controllable elasticity, biodegradability, and antioxidant properties can be developed (Serrano et al. Adv Mater, 2011. 23 (19): p. 2211-5; Yang J., et al., A thermoresponsive biodegradable polymer with intrinsic antioxidant properties. Biomacromolecules, 2014. 15 (11): 3942-52; U.S. Pub. No. 2014/0037588; herein incorporated by reference in its entirety). In some embodiments, polydiolcitrates comprise alternating diol (e.g., linear aliphatic diols) and citrate monomers. In some embodiments, the diol is between 2 and 30 carbons in length (e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, or ranges therebetween (e.g., 6-16, 7-14, etc.)). In some embodiments, a linear aliphatic diol is X carbons in length and comprises OH substituents at the 1 and X positions (e.g., 1,4-butanediol, 1,6-hexanediol, 1,8-octanediol, 1,10-decanediol, 1,12-dodecanediol, or any terminally-OH-substituted linear aliphatic diol from about 2-20 carbons in length). In certain embodiments, the diol comprises one or more C2-C20 alkyl-diols, C2-C20 alkenyl-diols, or mixtures thereof. In certain other embodiments, the diol comprises one or more C2-C20 alkyl-diols, such as a C6-C20 alkyl-diol, or a C6-C14 alkyl-diol, or a C6-C12 alkyl-diol. For example, the diol comprises an alkanediol, such as 1,12-dodecanediol, 1,10-decanediol, 1,8-octanediol, or a mixture thereof. In another example, the diol comprises 1,10-decanediol, 1,8-octanediol, or a mixture thereof. In another example, the diol comprises 1,8-octanediol (e.g., the polyester is poly(1,8-octanediol-citrate)).

In some embodiments, reagents, monomer components of polymers, methods, reaction conditions, etc. that find use in embodiments described herein are described in: U.S. Pat. Nos. 8,911,720; 8,772,437; 8,758,796; 8,580,912; 8,568,765; 8,404,264; U.S. Pub. No. 2014/0058049; U.S. Pub. No. 2013/0211500; U.S. Prov. App. No. 62/160,334; herein incorporated by reference in their entireties.

In some embodiments, materials comprise a poly(glycerol-diacid). A poly(glycerol-diacid), as used herein, is a polyester which is prepared from a triol monomer, glycerol, and a second monomer comprising two carboxylic acid functional groups (a "diacid") according to methods familiar to one skilled in the art. For example, suitable poly(glycerol-diacid) s can be prepared as described in U.S. Patent Application Publication No. 2003/0118692, which is hereby incorporated by reference in its entirety. Examples of diacids include, but are not limited to, aromatic-diacids (e.g., terephthalic acid and carboxyphenoxypropane), C2-C20 alkyl-diacids, C2-C20 alkenyl-diacids, and mixtures thereof.

In some embodiments, polymers are selected having reactive side groups that facilitate crosslinking and/or curing of the polymers, induced by an initiator (e.g., photoinitiator, thermal initiator) and initiation conditions (e.g., light (e.g., visible, UV, etc.), heat (e.g., physiologic temperature), etc.). In other embodiments, polymers (e.g., selected for their physical/mechanical characteristics) are modified to display reactive groups (e.g., acrylates, methacrylates, etc.). For example, in some embodiments, acrylate and/or methacrylate groups are added to polymers by reacting the polymers with a glycidyl methacrylate compound, glycidyl acrylate, or other acrylate/methacrylate-displaying reactive compounds. In some embodiments, methacrylated poly(diol citrates) are synthesized using methods and reagents understood in the field and/or described in the literature, for example, Wang et al. (Biomater Sci. 2013 June; 1(6):625-632; incorporated by reference in its entirety). In particular embodiments, poly(diol citrate) pre-polymer is methacrylated by dissolving the prepolymer in tetrahydrofuran, adding imidazole and then glycidyl methacrylate. The mixture is stirred under heat (e.g., about 60° C.). Solvent is removed (e.g., by rotary evaporation). The resulting methacrylated poly(diol citrate) may be purified in Milli-Q water and lyophilized to dryness. Acrylated poly(diol citrates) (aP(DC) s) are synthesized using analogous methods and reagents. Related polymers (e.g., comprising additional monomers and/or substituents) are acrylated/methacrylated using similar methods that are understood in the field and/or in references incorporated herein. Other polymers that find use in embodiments herein are acrylated/methacrylated using available methods. Other reactive groups may be added to polymers (e.g., poly(diol citrate)s or other polymers) using available chemistries and the disclosure herein.

In some embodiments, materials and methods herein comprise photoinitiators that induce polymerization and/or crosslinking of the reactive polymers and/or monomers described herein (e.g., displaying reactive moieties (e.g., acrylate and/or methacrylate moieties, etc.). In some embodiments, photoinitiators are small molecules that produce free radicals, cations, or anions when exposed to light of an appropriate wavelength (UV light (e.g., 10-400 nm (e.g., 10 nm, 20 nm, 40 nm, 60 nm, 80 nm, 100 nm, 120 nm, 140 nm, 160 nm, 180 nm, 200 nm, 220 nm, 240 nm, 260 nm, 280 nm, 300 nm, 320 nm, 340 nm, 360 nm, 380 nm, 400 nm, or ranges therebetween))). The free radicals, cations, or anions then initiate crosslinking and/or polymerization of reactive moieties displayed on the monomers or polymers. In some embodiments, a thermal initiator is water soluble, oil soluble, soluble is organic solvent, etc.

In some embodiments, a photoinitiator is a free-radical photoinitiator, a cationic photoinitiator, or an anionic photoinitiator. Classes of photoinitiators include, but are not limited to: benzoin ethers, benzyl ketals, α-dialkoxy acetophenones, α-hydroxy alkylphenomes, α-amino alkylphenomes, acylphosphine oxides, benzophenomes/benzoamines, thioxanthones/thioamines, etc. Examples of photoinitiators include, but are not limited to: acetophenone, anisoin, anthraquinone, anthraquinone-2-sulfonic acid monohydrate, (benzene) tricarbonylchromium, benzil, benzoin, benzoin ethyl ether, benzoin isobutyl ether, benzoin methyl ether, benzophenone, benzophenone/1-hydroxycyclohexyl phenyl ketone (blend), 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino) benzophenone, camphorquinone, 2-chlorothioxanthen-9-one, (cumene)cyclopentadienyliron(ii) hexafluorophosphate, dibenzosuberenone, 2,2-diethoxyacetophenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone (blend), 4'-ethoxyacetophenone, 2-ethylanthraquinone, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, thioxanthen-9-one, triarylsulfonium hexafluoroantimonate salts, triarylsulfonium hexafluorophosphate salts, etc.

In some embodiments, a photoinitiator is selected based upon the half-life of the photoinitiator when exposed to the appropriate wavelength of light. In some embodiments, the half-life of the photoinitiator determines the rate at which reactive species (e.g., cations, anions, radicals, etc.) are produced. In some embodiments, a polymerization and/or crosslinking step (e.g., a stereolithography step), facilitated by the photoinitiator, is a fast step (e.g., on the time scale of seconds or minutes). In some embodiments, the half-life of a suitable photoinitiator when exposed to the appropriate wavelength of light is between 1 second and 10 minutes (e.g., 1 second, 2 seconds, 5 seconds, 10 seconds, 20 seconds, 30 seconds, 45 seconds, 1 minute, 2 minutes, 3 minutes, 4 minutes, 5 minutes, 6 minutes, 7 minutes, 8 minutes, 9 minutes, 10 minutes, or ranges therebetween (e.g., 1-10 seconds)). In some embodiments, a photoinitiator is selected based on the reactivity of its decomposition product (e.g., free radical, cation, anion, etc.) with the reactive groups of the monomers and/or polymers to be polymerized and/or crosslinked.

In some embodiments, materials and methods herein comprise thermal initiators that induce curing of the reactive polymers described herein (e.g., displaying reactive moieties (e.g., acrylate and/or methacrylate moieties, etc.). In some embodiments, thermal initiators are small molecules that produce free radicals, cations, or anions when exposed to heat (e.g., temperatures above a threshold (e.g., 34° C., 35° C., 36° C., 37° C., 38° C., 39° C., 40° C., or ranges therebetween). The free radicals, cations, or anions then initiate crosslinking of reactive moieties displayed on the polymers. In some embodiments, activation of thermal initiators (e.g., by heat) results in curing of a reactive material (e.g., displaying reactive moieties (e.g., acrylate and/or methacrylate moieties), etc.). In some embodiments, curing occurs over a time span (e.g., 1 minute, 2 minutes, 5 minutes, 10 minutes, 20 minutes, 30 minutes, 1 hour, 2 hours, 4 hours, or more, or ranges therebetween). In some embodiments, the curing results in the formation of a thermoset material. In some embodiments, a thermal initiator is water soluble, oil soluble, soluble is organic solvent, etc. In some embodiments a thermal initiator is an azo-initiator. Suitable azo initiators are available, for example, from Wako Specialty Chemicals, and include for example:

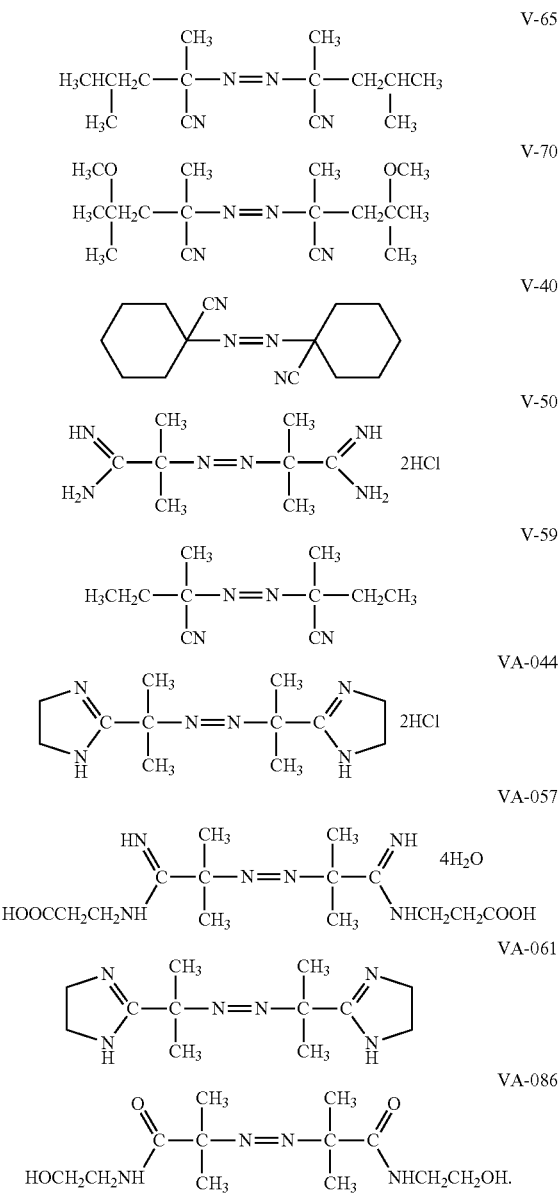

Other examples of suitable initiators include azo-N,N'-bisdimethylvaleronitrile (ABDV), azo-N,N'-bisisobutyronitrile (AIBN), or any other azo-based initiator. In some embodiments, other initiators, such as, peroxides, halogens, metal iodides, metal alkyls, persulfates, etc. find use in embodiments herein as thermal initiators, to the extent that they initiate curing of reactive polymers under desired temperature conditions.

In some embodiments, a thermal initiator is a free-radical thermal initiator. Examples of free-radical thermal initiators include: tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy) butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3, 5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate, etc.

In some embodiments, a thermal initiator is a cationic thermal initiator. Examples of cationic thermal initiators include: dicyandiamide, cyclohexyl p-toluenesulfonate, diphenyl(methyl)sulfonium tetrafluoroborate, etc.

In some embodiments, a thermal initiator is an anionic thermal initiator. Examples of anionic thermal initiators include: phosphonamidates, hydroxyamide, etc.

In some embodiments, a thermal initiator is selected based upon the half-life of the thermal initiator at a desired temperature. In some embodiments, the half-life of the thermal initiator determines the rate at which reactive species (e.g., cations, anions, radicals, etc.) are produced. In some embodiments, a curing step, facilitated by the thermal initiator, is a slow step (e.g., on the time scale or minutes, 10s of minutes, or hours). In some embodiments, the half-life of a suitable thermal initiator at a desired temperature (e.g., physiologic temperature) is between 1 minute and 10 hours (e.g., 1 minute, 2 minutes, 5 minutes, 10 minutes, 20 minutes, 30 minutes, 45 minutes, 1 hour, 2 hours, 3 hours, 4 hours, 5 hours, 6 hours, 7 hours, 8 hours, 9 hours, 10 hours, or ranges therebetween). In some embodiments, a thermal initiator is selected based on the reactivity of its decomposition product (e.g., free radical, cation, anion, etc.) with the reactive groups of the polymers to be cured.

In some embodiments, composite materials herein or reactants for synthesizing composite materials herein comprise 0.1%-10% (e.g., 0.1%, 0.2%, 0.5%, 0.75%, 1%, 1.25%, 1.5%, 1.75%, 2%, 2.5%, 3%, 4%, 5%, 6%, 7%, 8%, 9%, 10%, or ranges therebetween) thermal initiator (e.g., V70, IRGACURE, other thermal initiators herein, or combinations thereof).

In some embodiments, materials described herein comprise composites of the reactive polymer materials described herein and one or more additional components (e.g. in additional to initiator compounds). In some embodiments, additional components comprise 1-99 wt % of the composite material (e.g., 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 96%, 97%, 98%, 99%, or ranges therebetween).

In some embodiments, a composite material comprises at least 1% (e.g., >>1%, >2%, >3%, >4%, >5%, >10%, >20%, >30%, >40%, >50%, >60%, >70%, >80%, >90%, >95%, >98%, >99%) reactive polymer (e.g., citrate-based polymer (e.g., methacrylated poly(diol citrate), etc.)). In some embodiments, a composite material comprises less than 99% (e.g., <99%, <98%, <95%, <90%, <80%, <70%, <60%, <50%, <40%, <30%, <20%, <10%, <5%, <4%, <3%, <2%, <1%) reactive polymer (e.g., citrate-based polymer (e.g., methacrylated poly(diol citrate), etc.)). In some embodiments, a composite material comprises reactive polymer (e.g., citrate-based polymer (e.g., methacrylated poly(diol citrate), etc.)) in an amount of about 99%, about 98%, about 95%, about 90%, about 80%, about 70%, about 60%, about 50%, about 40%, about 30%, about 20%, about 10%, about 5%, about 4%, about 3%, about 2%, about 1%, or ranges therebetween. In some embodiments, a composite material comprises 1-99% (e.g., 1%, 2%, 5%, 10%, 15%, 20%, 25%, 30%, 35%, 40%, 45%, 50%, 55%, 60%, 65%, 70%, 75%, 80%, 85%, 90%, 95%, 98%, 99%, or ranges therebetween) reactive polymer (e.g., citrate-based polymer (e.g., methacrylated poly(diol citrate), etc.)). The aforementioned percentages may be wt % or molar %.

In some embodiments, provided herein is a mixture comprising: (1) a citrate-based polymer component (e.g., methacrylated poly(diol citrate), etc.), (2) a photoinitiator, (3) an thermal initiator (e.g., V70, VA-044, etc.), (4) an additional structural component (e.g., a poly (L) lactic acid (PLLA), and (5) a contrast agent. In some embodiments, the mixture further comprises a solvent and/or additional components. In some embodiments, exposure of such a mixture to the appropriate wavelengths of light (e.g., via light-induced 3D printing system) results in formation of a composite material comprising: (1) a photocrosslinked-version of the citrate-based polymer component (e.g., methacrylated poly(diol citrate), etc.), (2) the thermal initiator (e.g., V70, VA-044, etc.), (3) the additional structural component (e.g., PLLA), and (4) the contrast agent.

In some embodiments, the mixture further comprises a suitable solvent (e.g., for dissolving one or more reagents in). In some embodiments, suitable solvents may be selected from: MeOH, EtOH, dioxane, acetone, 1,3-dioxolane, N,N-dimethylformamide, etc. In some embodiments, solvents are included in a reagent mixture at a wt % or molar % of between 5% and 50% (e.g., 5%, 10%, 15%, 20%, 25%, 30%, 35%, 40%, 45%, 50%, or ranges therebetween).

In some embodiments, provided herein are composite materials (e.g., malleable solid materials) comprising: (1) a photocrosslinked citrate-based polymer component (e.g., methacrylated poly(diol citrate), etc.), (2) an thermal initiator (e.g., V70, VA-044, etc.), (3) an additional structural component (e.g., poly (L) lactic acid) and (4) a contrast agent. In some embodiments, exposure of such a compound to the appropriate temperature (e.g., by placing the material into a physiologic system (e.g., implanting in a subject)) results in formation of a rigid material comprising: (1) a photo/thermal crosslinked-version of the citrate-based polymer component (e.g., methacrylated poly(diol citrate), etc.), (2) the additional structural component (e.g., PLLA), and (3) the contrast agent.

In some embodiments, the additional structural component is poly (L) lactic acid (PLLA). Polylactides have long been safely used in medical applications, such as pins, plates, screws, intra-bone and soft-tissue implants, and as vectors for sustained release of bioactive compounds (see, e.g., Chandy et al., *Drug Deliv*, 8:77 (2001); Chen et al., *J Biotechnol.*, 130:107 (2007); and Wang C. H., Hsiue G. H., *Bioconjug Chem.*, 16:391 (2005)). The L-isomer of polylactic acid is a biodegradable, biocompatible, biologically inert, synthetic polymer. Solvent-cast/particulate leaching techniques typically are used to fabricate microporous PLLA-containing scaffolds (see, e.g., Mikos et al., *Polymer*, 35:1068 (1994)). In the methods described herein, PLLA may be dissolved in a suitable solvent (as described herein). In some embodiments, the PLLA is dissolved in tetrahydrofuran (THF). Inclusion of dissolved PLLA in the compositions or composite materials described herein enhances the material strength of the composition, resulting in thinner, lower-profile objects (e.g., scaffolds, stents) produced by the disclosed methods.

In some embodiments, the composition comprises a contrast agent, which enables imaging of an object (e.g., and implant or device) generated by 3D printing using the composition. The term "contrast agent," as used herein, refers to a substance that increases the contrast of structures or fluids within an organism, typically for medical imaging. Any suitable contrast agent may be included in the composition, including, but not limited to, a radiocontrast agent (i.e., used in radiography), an MRI contrast agent (i.e., used in MRI), and/or an ultrasound contrast agent (i.e., used in ultrasound). Examples of suitable radiocontrast agents include iodine-containing compounds or compositions (e.g., iodixanol/VISIPAQUE™) and barium-containing compounds or compositions. Examples of suitable MRI contrast agents include gadolinium-based compounds or compositions and iron oxide-containing compounds or compositions. Suitable ultrasound contrast agents include, for example, gas microbubbles. In some embodiments, the contrast agent is iodixanol.

In some embodiments, other additives are included in the composites of reactive citrate-based polymer materials described herein. For example, in some embodiments a metal organic frameworks (MOFs), such as copper (Cu) MOFs are included in composites herein and/or mixtures for the synthesis thereof. The inclusion of MOFs in polymer composites is described, for example in U.S. Pub No. 2018/0236122, POLYMER METAL-ORGANIC FRAMEWORK COMPOSITES; herein incorporated by reference in its entirety). In some embodiments, the MOF comprises transition metal nodes connected by a organic ligands. In some embodiments, the transition metal is selected from the list consisting of: copper (Cu), zinc (Zn), magnesium (Mg), cobalt (co), Nickel, (Ni), iron (Fe), manganese (Mn), palladium (Pd), chromium (Cr), lead (Pb), titanium (Ti), and combinations thereof. In some embodiments, the transition metal is copper. In some embodiments, the organic ligand comprises: (a) a substructure comprising alkyl, cycloalkyl, heteroalkyl, aryl, and heteroaryl groups; the substructure displaying (b) a plurality of metal ion coordination groups. In some embodiments, the metal ion coordination groups comprise COOH groups. In some embodiments, the organic ligand comprises a molecule selected from the list consisting of: 1,4-di(4'-pyrazolyl)benzene, 1,4,7,10-tetraazacyclododecane-n,n',n'',n'''-tetraacetic acid, 2,4,6-(tri-4-pyridinyl)-1,3,5-triazine, tris(isobutylaminoethyl)amine, [1,1'-biphenyl]-4,4'-dicarboxylic acid, 2,5-dihydroxyterephthalic acid, 2,6-naphthalenedicarboxylic acid, 1,4-phenylenediacetic acid, 1,1,2,2-tetra(4-carboxylphenyl)ethylene, 1,3,5-tricarboxybenzene, 1,3,5-tris(4-carboxyphenyl)benzene, and 2-(diphenylphosphino)terephthalic acid. In some embodiments, the MOF comprises copper metal ion nodes linked by 1,3,5-tricarboxybenzene organic ligands. In some embodiments, a MOF (e.g., Cu MOF) is included in a composited herein or a reaction mixture to produce such a composite in a wt % or molar % of 0.1%-10% (e.g., 0.1%, 0.2%, 0.5%, 0.75%, 1%, 1.25%, 1.5%, 1.75%, 2%, 2.5%, 3%, 4%, 5%, 6%, 7%, 8%, 9%, 10%, or ranges therebetween).

In some embodiments, provided herein is a mixture comprising: (1) a citrate-based polymer component (e.g., methacrylated poly(diol citrate), etc.), (2) a photoinitiator, (3) a thermal initiator (e.g., V70, VA-044, etc.), (4) a poly (L) lactic acid, and (5) a contrast agent (e.g., iodixanol). In some embodiments, the mixture further comprises a solvent and additional components. In some embodiments, exposure of such a mixture to the appropriate wavelengths of light (e.g., via light-induced 3D printing system) results in formation of a composite material comprising: (1) a photo-crosslinked-version of the citrate-based polymer component (e.g., methacrylated poly(diol citrate), etc.), (2) the thermal initiator (e.g., V70, VA-044, etc.), (3) the poly (L) lactic acid, and (5) the contrast agent (e.g., iodixanol).

In some embodiments, provided herein are composite materials (e.g., malleable solid materials) comprising: (1) a photocrosslinked citrate-based polymer component (e.g., methacrylated poly(diol citrate), etc.), (2) a thermal initiator (e.g., V70, VA-044, etc.), (3) a poly (L) lactic acid, and (4) a contrast agent (e.g., iodixanol). In some embodiments, exposure of such a compound to the appropriate temperature (e.g., by placing the material into a physiologic system (e.g, implanting in a subject)) results in formation of a rigid material comprising: (1) a photo/thermal crosslinked-version of the citrate-based polymer component (e.g., methacrylated poly(diol citrate), etc.), (2) the poly (L) lactic acid, and (3) the contrast agent (e.g., iodixanol).

In some embodiments, composite materials comprise one or more additional polymeric components (e.g., in addition to the citrate-based polymer component (e.g., methacrylated poly(diol citrate)). Suitable biodegradeable polymers include, but are not limited to: collagen, elastin, hyaluronic acid and derivatives, sodium alginate and derivatives, chitosan and derivatives gelatin, starch, cellulose polymers (for example methylcellulose, hydroxypropylcellulose, hydroxypropylmethylcellulose, carboxymethylcellulose, cellulose acetate phthalate, cellulose acetate succinate, hydroxypropylmethylcellulose phthalate), casein, dextran and derivatives, polysaccharides, poly(caprolactone), fibrinogen, poly (hydroxyl acids), poly(L-lactide) poly(D,L lactide), poly(D,L-lactide-co-glycolide), poly(L-lactide-co-glycolide), copolymers of lactic acid and glycolic acid, copolymers of ε-caprolactone and lactide, copolymers of glycolide and ε-caprolactone, copolymers of lactide and 1,4-dioxane-2-one, polymers and copolymers that include one or more of the residue units of the monomers D-lactide, L-lactide, D,L-lactide, glycolide, ε-caprolactone, trimethylene carbonate, 1,4-dioxane-2-one or 1,5-dioxepan-2-one, poly(glycolide), poly(hydroxybutyrate), poly(alkylcarbonate) and poly(orthoesters), polyesters, poly(hydroxyvaleric acid), polydioxanone, poly(ethylene terephthalate), poly(malic acid), poly(tartronic acid), polyanhydrides, polyphosphazenes, poly(amino acids), and copolymers of the above polymers as well as blends and combinations of the above polymers. (See generally, Illum, L., Davids, S. S. (eds.) "Polymers in Controlled Drug Delivery" Wright, Bristol, 1987; Arshady, J. Controlled Release 17:1-22, 1991; Pitt, Int. J. Phar. 59:173-196, 1990; Holland et al., J. Controlled Release 4:155-0180, 1986; herein incorporated by reference in their entireties). Suitable non-biodegradable polymers include silicone rubber, polyethylene, acrylic resins, polyurethane, polypropylene, and polymethylmethacrylate.

In some embodiments, polymers are obtained and/or prepared according to standard techniques. For example, methods and materials for synthesis of poly(diol citrate) polymers and related polymers (e.g., further comprising glycerol or other additional monomers) are described in the literature, such as Yang et al. (Biomaterials. 2006 March; 27(9):1889-98; incorporated by reference in its entirety) and other patents and publications incorporated herein by reference in their entireties. In some embodiments, to synthesize poly(diol citrate) polymer, approximately equimolar amounts of citric acid and diol (e.g., linear aliphatic diol, terminal-OH diols, one diol species, multiple diol species, etc.) are melted together (e.g., under inert (e.g., nitrogen) atmosphere, at about 165° C., etc.) with stirring (e.g., for 20 min). The temperature is subsequently decreased to an appropriate polymerization temperature (e.g., about 140° C.) and the mixture is stirred (e.g., for 30-120 min) to obtain the poly(diol citrate) pre-polymer. In some embodiments, the pre-polymer is dissolved in ethanol, purified in Milli-Q water, and/or lyophilized to dryness. Related polymers (e.g., comprising additional monomers and/or substituents) are prepared using similar methods that are understood in the field and/or in references incorporated herein. Other polymers that find use in embodiments herein are obtained and/or prepared using available methods and the disclosure herein.

In some embodiments, compositions and methods are provided that utilize a two-step procedure for (1) forming 3D structures from desired materials, and (2) curing the 3D structures into a fixed position/shape/orientation.

In some embodiments, the first step is a polymerization (of reactive monomers) or crosslinking (of reactive polymers) reaction that is facilitated by the presence of a photoinitiator. In some embodiments, the photoinitiator allows for stereolithographic methods (e.g., photo-induced 3D printing) to be used to fabricate a 3D object or device from a desired polymeric material. In some embodiments, the photoinitiator initiates a rapid polymerization/crosslinking reaction to facilitate the repeated reactions required for stereolithography (e.g., 3D printing). In some embodiments, the photoinitiator-induced reaction results in a solid material, but one that exhibits a degree of malleability (e.g., not completely rigid, not a thermoset, incomplete crosslinking of reactive groups, etc.).

Any suitable 3D printing and/or additive manufacturing techniques and/or systems that make use of photo-induced polymerization may find use in embodiments herein. For example, in conventional additive or three-dimensional fabrication techniques, construction of a three-dimensional object is performed in a step-wise or layer-by-layer manner. In particular, layer formation is performed through solidification of photo-curable resin under the action of visible or UV light irradiation. Layers may be formed on the top or bottom surface of a growing object (e.g., U.S. Pat. No. 5,236,637; incorporated by reference in its entirety). Many 3D printing techniques are understood in the file and applicable to embodiments herein. Alternatively, methods of continuous liquid interface printing (or processing) CLIP are provided (e.g., U.S. Pat. No. 9,360,757; incorporated by reference in its entirety). CLIP uses photo polymerization to create objects of a wide variety of shapes. The continuous process begins with a pool of liquid photopolymer resin. Part of the pool bottom is transparent to ultraviolet light (the "window"). An ultraviolet light beam shines through the window, illuminating the precise cross-section of the object. The light causes the resin to solidify. The object rises slowly, to allow resin to flow under and maintain contact with the bottom of the object. An oxygen-permeable membrane lies below the resin, which creates a persistent liquid interface that prevents the resin from attaching to the window and prevents photopolymerization between the window and the polymerize.

In some embodiments, techniques and systems are selected (e.g., microCLIP) that allow for the fabrication of objects displaying microscale features (microstructures), such as pores. In some embodiments, techniques are utilized that, using the materials described herein, are useful in producing objects of any suitable shape with feature resolution of as low as 10 μm (e.g., 10 μm resolution, 15 μm resolution, 20 μm resolution, 25 μm resolution, 30 μm resolution, 35 μm resolution, 40 μm resolution, 45 μm resolution, 50 μm resolution, etc.).

In some embodiments, the second step is a curing reaction (e.g., extensive crosslinking between reactive groups) that is facilitated by the presence of a thermal initiator. In some embodiments, the thermal initiator allows for fixing a 3D object or device into a desired shape/position/orientation. In some embodiments, the first step produces a solid object of defined shape and optionally comprising desired microstructures, but the object is soft or malleable. In some embodiments, the shape of the first-step object can be manipulated by a user, for example, when inserting the object into a location for a desired application (e.g., into a subject). In some embodiments, the dimensions of the first-step object can be altered by up to 25% (e.g., 1%, 2%, 5%, 10%, 15%, 20%, 25%, or ranges therebetween) due to the malleability of the object. In some embodiments, the thermal initiator initiates a slow curing reaction that allows the object/device to be manipulated into a desired shape/position/orientation (e.g., implanted into a subject) as it becomes a more rigid material. In some embodiments, the thermal-initiator-induced reaction results in a rigid material (e.g., thermoset) that will maintain its shape/position/orientation under forces/stresses consistent with the particular use. In some embodiments, the second step curing results in near complete (e.g., >90%, >95%, >99%, etc.) crosslinking of reactive groups and formation of a thermoset.

As described throughout, provided herein are materials (e.g., inks) that are photo-crosslink able to form thermoresponsive materials (e.g., polymers and composites thereof) and objects (e.g., biocompatible devices) made therefrom. The two-step fabrication process allows: (1) an object of a desired size, shape, microstructure (e.g., porosity (e.g., pore size and density)) to be fabricated using photo-induced printing techniques (e.g., microCLIP), (2) the object to be placed in a desired location and conformation for a desired application, and (3) the object to be fixed (e.g., cured) into the desired location and conformation by the application of heat to the object (e.g., from the physiologic location of the object, externally-applied heat, etc.).

These materials find use in a variety of applications. For example, materials herein find use in any application an object (e.g., of desired shape/size/microstructure) is applied in a malleable form, and then is rendered rigid when exposed to heat (e.g., physiological temperature). Materials described herein find use, for example, in medical applications, such as treatment of cardiovascular disease. In some embodiments, materials find use in opening of narrowed arteries (e.g., due to restenosis), delivering controlled-release drugs to affected cardiac tissue, and/or promoting blood vessel regeneration. In some embodiments, material find use in medical implants, such as stents, valves, etc. In some embodiments, materials find use in non-medical applications. In this regard, provided herein is a method of promoting blood vessel regeneration at a defect site (e.g., vascular tissue, cardiac tissue, blood vessels (e.g., coronary arteries)) in a subject comprising (a) placing at the defect site a malleable solid implant generated by photoinitiated 3D printing using the composition described herein as an ink; and (b) allowing the implant to undergo thermally-induced curing within the subject to form a thermoset implant at the defect site. In some embodiments, the method further comprises exposure to UV light or incubation at elevated temperature prior to placing the malleable solid implant at the defect site. In some embodiments, exposure to UV light or incubation at elevated temperature (e.g., 30-50° C.) initiates but does not complete the formation of the thermoset implant prior to implantation.

In some embodiments, the implant is visualized at the defect site because of the presence of the contrast agent in the implant. Visualization may be performed using any imaging method suitable for medical applications. Such imaging methods include, but are not limited to, radiography (X-ray), ultrasound, magnetic resonance imaging (MRI), positron emission tomography (PET), computed axial tomography (CAT), and computer tomography (CT).

In some embodiments in which the materials herein are used for the repair, stabilization, regeneration, growth, etc. of vascular tissue (e.g., cardiac tissue, blood vessels), the materials further comprise additional components/agents to facilitate incorporation into the heart, blood vessels (e.g., coronary arteries), etc. In some embodiments, additional components/agents are incorporated into the materials and encapsulated within the material upon first-step crosslinking. In such embodiments, additional components/agents are non-covalently associated with the polymer and other components of the materials. In other embodiments, additional components/agents are covalently-linked to the reactive polymer and/or other components of the material.

In some embodiments, the materials described herein find use in the delivery of growth factors or other bioactive agents for the regeneration of blood vessels. Suitable agents for use in embodiments herein include vascular endothelial growth factor (VEGF), fibroblast growth factor (FGF), angiopoietins, matrix metalloproteinases, etc. In addition or alternatively, the materials described herein may be used to deliver bioactive agents that inhibit cell proliferation to treat restenosis (i.e., the recurrence of abnormal narrowing of an artery or valve after corrective surgery). Such agents are used in drug-eluting stents (DES) and include, but are not limited to, antineoplastic agents (e.g., paclitaxel), immunosuppressives (e.g., rapamycin), and migration inhibitors (e.g., halofuginone) (Moreno, R., *Rev Esp Cardiol.*, 58:842-62 (2005)). The aforementioned agents, or others, may be covalently linked to materials described herein or components thereof, non-covalently associated with moieties displayed on materials described herein or components thereof, embedded within materials described herein, etc.

EXPERIMENTAL

Example 1

Methods

Polymer Synthesis and Characterization

To synthesize a photocurable polydiolcitrate, citric acid and 1,12-dodecanediol were first melted in a 2:1 ratio (165° C., $N_2$) and co-polymerized at 140° C. for 30 minutes to create a pre-polymer that was purified and freeze-dried. The pre-polymer was dissolved in tetrahydrofuran (THF) with imidazole and glycidyl methacrylate, heated (60° C., 6 hours), and purified to yield methacrylated poly(1,12-dodecamethylene citrate) (mPDC). The chemical structure of mPDC was characterized by $^{H}NMR$ and FTIR.[29]

BVS Design and 3D Printing Process 3D fabrication of stents was performed using a custom-made μCLIP device that utilizes 365 nm wavelength light for photopolymerization (FIG. 1). The dynamic mask generator for projecting stent cross sections was a 1080p digital micro mirror device (DMD, Texas Instruments). Optics of the printer were optimized to have pixel resolution of 7.1 μm×7.1 μm at the focal plane. The maximum build volume for the system was 7.67 mm×13.69 mm×40 mm. All stent designs were spliced with a layer thickness of 5 μm and paused at each layer for 1 ms. Stent design was created with SolidWorks CAD software, and layer photomask slicing performed using a custom Matlab program. The unit cell used in this study was designed to have increased rigidity rather than flexibility.

An Imaging Compatible Biomaterial Ink Composition (IC-Bink™)

To formulate the Bink™, 85 wt % mPDC was mixed with 2.2% IRGACURE 819 (photo-initiator), 2.2% co-initiator ethyl 4-dimethylamino benzoate (EDAB) in ethanol (solvent to control viscosity). 5.5, 4 and 2% (w/v) of iodixanol were successfully incorporated into the Bink™ to prepare IC-Bink™.

Visibility of 3D Printed BVSs

BVSs with and without contrast agent (iodixanol) were imaged using microCT at the Center for Advanced Molecular Imaging (CAMI), Northwestern University (Evanston, IL). The radiopacity of BVSs in a chicken leg was tested using a clinical digital radiograph at Northwestern University (Chicago, IL) to evaluate how tissue affects the optical properties.

Composite BVS with PLLA Nanofibers

MPDC was combined with IRGACURE 819 photoinitiator (2.2 wt. %), V70 heat induced crosslinker, and 3% ethyl 4 dimethylamino benzoate. To improve mechanical properties for 100 μm strut thickness, 10% (wt./vol.) of poly (L) lactic acid (PLLA) within tetrahydrofuran (THF) was incorporated into the ink. Incorporated mass percentage of PLLA and THF accounted for ~2% and 18%, respectively. BVSs were fabricated with an OD of 3 mm and 16 mm length in the arrowhead design with 100 μm strut thickness and 250 μm strut width. Fabricated BVSs were immediately placed into a −80° C. freezer for 1 hour followed by a −20° C. freezer to induce nanofiber formation of the PLLA within the fabricated BVSs. Next the BVSs were placed within deionized (DI) water for 24 hours to allow solvent exchange with THF. Following the solvent-exchange, the BVSs were subjected to various forms of post-polymerization: Ultraviolet flood irradiation, 120° C. heating, and a combination of the two. Ultraviolet flood irradiation was performed via FEI flood exposure system for 3 minutes. Heat exposure was performed for 10 hours. Combination exposure consisted of 3 minutes UV flood exposure followed by 2, 10, and 20 hours of 120° C. Following post-polymerization/processing, all printed BVSs were soaked in DI water for at least 10 hours prior to compression.

Bulk property measurements were then performed with the composite inks. Tensile dogbone samples were printed with intended dimensions of 450 μm×750 μm cross sectional area and tensile testing region length of 13 mm. Within these experiments, the V70 thermal radical initiator was removed. New parameters were also tested: effect of hydration (PBS soaking); effect of prepolymer (mPDC vs mPOC, prepolymer made with octanediol); and effect of "buffer" solvents acetone vs dichloromethane.

Mechanical Testing

All BVSs were incubated in PBS for at least 12 hours to mimic the physiological conditions. Immediately prior to testing, stents were removed from PBS and air-dried. BVSs were then loaded into a Sintech 20G and compressed to approximately 75% of their original diameter. The data was exported to Microsoft Excel, where it was analyzed.

All dogbone tensile samples were tested via the Instron 5940 device with an extension rate of 1 mm/min. Data was exported to Microsoft Excel where it was analyzed.

Biocompatibility 3D printed BVSs were incubated in series of Ethanol solutions (100%-20 min, 70%-20 min and 50%-30 min) and basal media (24 hours) to remove any excess uncured monomers. Next, they were incubated in complete cell culture media at 37° C. and media were collected at 24, 48 and 72 hours. Human umbilical vein endothelial cells (HU- VECs, Lonza) were cultured in endothelial growth medium-2 (EGM-2, Lonza) using standard cell culture practice. HUVECs were seeded in 24 well plates (20,000 cells/well) and cultured with the extracted cell media from BVS incubation for 3 days. Analysis of cell proliferation and cytotoxicity was performed via Alamar Blue assay (Fisher Scientific) by following the manufacture's protocol. The cells were incubated with alamar blue dye (440 μmol) and fluorescence was measured using a fluorescent spectrophotometer.

BVS Degradation 3D printed BVSs were placed in a test tube containing 10 ml of 0.1 M NaOH to evaluate accelerated degradation and 10 ml of DI water. BVSs were incubated at 37° C., washed with water and dried under vacuum overnight at each measurement time point. Weight loss was calculated by comparing the initial weight (W0) with the weight measured at reported time point (Wt). Weight loss (%) was calculated using following formula: Weight loss (%)=100*(W0−Wt)/W0. The results are shown as standard+standard deviation (n=3).

BVS Implantation In Vivo

The BVS with 100 μm strut thickness was tested in Sprague Dawley rats (200-250 g) using an abdominal aorta stenting procedure.[31] A small incision was made in the distal end of the isolated aortic segment. After the segment was rinsed with saline, the tip of the balloon catheter (Boston Scientific, Apex) was inserted and the BVS (3 mm in diameter, 12 mm in length) was deployed.

Results

A High Speed 3D Printing of Low Profile BVS

The high-resolution μCLIP process (3rd generation stereolithography) photopolymerizes each subsequent fabrication "layer" through patterned UV projection (FIG. 1). The projection polymerization methodology significantly parallelizes the otherwise slow 3D printing processes, which are serial in nature. For scanning stereolithography and other point-by-point fabrication methods, typical fabrication time scale to approximately:

$$\left(\frac{\text{dimension}}{\text{smallest feature size}}\right)^3 \cdot 32$$

The μCLIP process, in contrast, utilizes an oxygen permeable membrane as the optically transparent window. This creates an oxygen-rich region near the membrane, effectively inhibiting the photopolymerization under the illumination of the projected UV light. This unique design effectively avoids the adhesion of the polymerized structure to the optical windows, making it possible to create 3D structures under a continuous upwards motion of the substrate stage (Z-stage) with significant reduction in the fabrication time. Where standard high-resolution 3D printing processes typically take several hours to fabricate cm-scale length parts, μCLIP is able to fabricate cm-scale high-resolution parts within a single hour. Synchronization of the display on the dynamic mask and the continuous motion of the Z-stage rapidly fabricates the sophisticated 3D structures, making the fabrication time scale to $$\left(\frac{\text{Length}}{\text{stage speed}}\right) \cdot 28$$

The μCLIP process offers the following unique advantages when compared to other established additive manufacturing processes:

1. High-resolution (sub-10 μm, X, Y, and Z directions) 3D printing process is well suited to fabricate a 3D BVS with smooth surfaces. For completely vertical surfaces, evidence of layering is removed. The resolution of this system is more than 10 times better than the commercially available system;
2. Extremely fast fabrication process. A 20 mm long 3D BVS containing 4000 cross-sectional layers can be printed in just 15-17 minutes. Standard projection stereolithography would require 16-18 hours.[28] (FIG. 1);
3. Uniform mechanical properties: Continuous stage motion allows photopolymerization of each layer into the next to create monolithic parts with internal uniformity and integrity, resulting in isotropic mechanical properties. Individual fabricated layers of typical 3D printing can create non-uniform structural properties.[28]
4. Prepolymer flexibility: μCLIP can accommodate photopolymerizable polymers with a wide range of viscosities.
5. Utilizes ambient air as oxygen source: No need for extra oxygen input into the optical pathway for rapid fabrication. Low UV power (1-10 mW/cm2) allows ambient oxygen to sufficiently diffuse and inhibit polymer/window adhesion. These unique capabilities suggest that the μCLIP process is well suited for rapid fabrication of BVS at a relatively low cost.

Visibility of 3D Printed BVSs

The ability to visualize 3D-printed BVS using non-invasive techniques is crucial for monitoring degradation and placement of the BVS once implanted. We hypothesized that contrast agents can be incorporated into the mPDC in order to print radiopaque BVSs. We investigated the feasibility of printing BVS that contained iodixanol, a commercially available iso-osmolar contrast agent, known as Visipaque, which is commonly used during fluoroscopy and angiography. 5.5, 4 and 2% (w/v) of iodixanol were successfully incorporated into the mPDC and used to fabricate BVSs. BVSs with and without contrast agent were imaged using microCT at the Center for Advanced Molecular Imaging (CAMI), Northwestern University (Evanston, IL) (FIG. 2A). 5.5 and 4% (w/v) resulted in very good visualization of the BVS. We further evaluated the radiopacity of BVSs in a chicken leg to test how tissue affects the optical properties using a clinical digital radiograph at Northwestern University (Chicago, IL) (FIGS. 2B and 2C). The BVS containing 5.5% contrast agent showed the most promising results.

Composite BVS with PLLA Nanofiber

Figure 2:
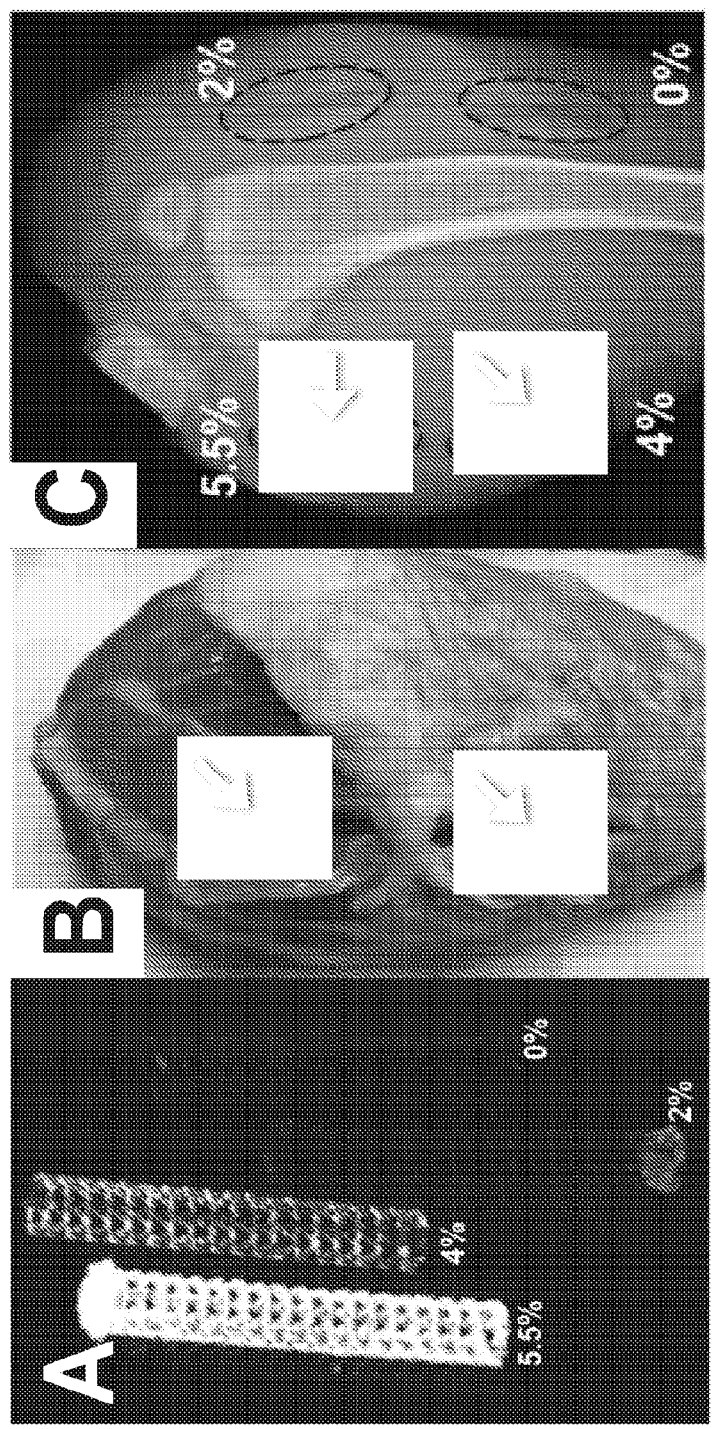
FIG. 2 includes images showing iodixanol-based radiopacity of BVS.

A previously published study demonstrated that scaffolds made from the citrate-based B-Ink™ material could obtain radial stiffness that was comparable to Nitinol stents with strut dimensions comparable to other BVS (strut thickness ~150-200 μm).[16,17] Taking advantage of the 7 μm fabrication precision offered by the μCLIP process, we successfully reduced the strut thickness down to 75 μm with excellent dimensional fidelity (FIG. 2). In order to maintain the comparable radial stiffness, a more recent preliminary study focused on further enhancing the material strength by employing a new composite materials strategy and the combination of UV and thermal post processing curing conditions. This approach is similar to that employed by Carbon in their commercial product development.[33]

Figures 3A, 3B:
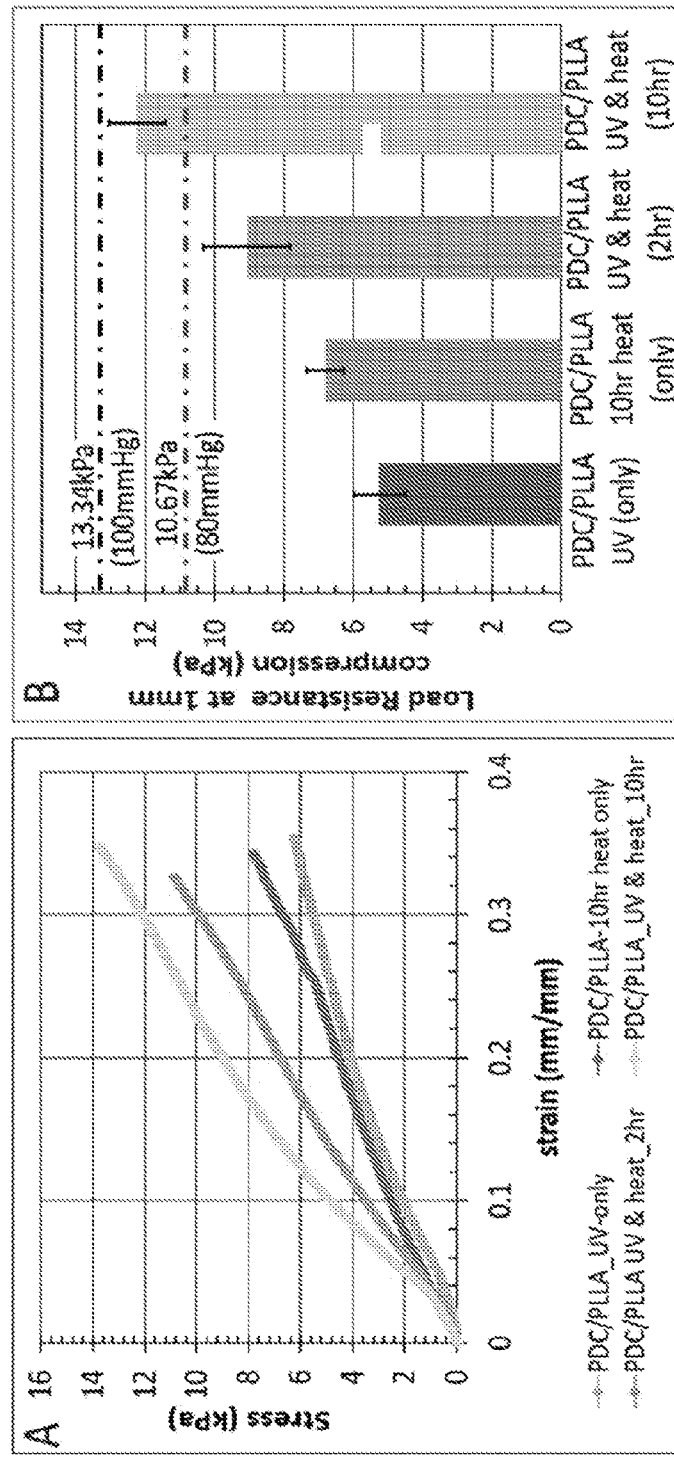
FIG. 3A is a stress vs. strain graph for BVSs with 100 μm strut thickness tested using parallel plate compression.
FIG. 3B is a stress vs. strain graph for BVSs with 100 μm strut thickness tested using a load resistance (kPa) at 1 mm compression. The region between horizontal dashed red and black lines represents the typical physiological loading range that a stent must withstand (80-100 mmHg or 10.67-13.34 kPa) N=3±S.D.

The low-profile BVSs disclosed herein utilized B-Ink containing 10% (wt./vol.) of PLLA/tetrahydrofuran solution, 3% (wt./wt.) ethyl 4 dimethylamino benzoate, 2.2% IRGACURE 819 (photoinitiator) and 1% V70 (temperature initiator). Total PLLA within the B-Ink formulation was 2% (wt./wt.). Use of this material (after temperature-induced phase separation at −80° C. for 1 hour and solvent exchange in DI water) yielded a composite BVS that is primarily the citric acid biomaterial reinforced by nanofibrous PLLA.[34] Experimentally measured stress-strain curves from parallel plate compression results for BVSs with 100 μm strut thickness fabricated under various processing conditions confirm that the mechanical properties can be controlled and targeted to meet physiological load resistance stresses (FIG. 3). When placed in the body, the BVS must be able to withstand loading pressures or resistance in a range of 80 mmHg to 100 mmHg (10.67 kPa and 13.34 kPa, respectively (FIG. 3B)) taking vessel and blood pressure into account.[35] Furthermore, the BVS must support crimping around a deflated balloon catheter (FIG. 4). Load resistance is defined as any singular stress value within the stress vs. strain curve and is noted at a particular value of compression. A 3-minute post-polymerization time with UV (365 nm) resulted in BVSs with a stiffness of 13 kPa and a resistance to deformation at 1 mm compression of 5.25 kPa. Post-polymerization using heat at 120° C. for 10 hours increased the stiffness to 22 kPa and resistance at 1 mm compression to 7.13 kPa. Because there are two types of free radical generators in the B-Ink, it is reasonable that combined UV and heat exposure improved overall stiffness. Utilizing combined 3 minute UV and 120° C. heating methods greatly improved mechanical properties with increasing heating time. For 2 and 10 hours of heating, the corresponding stiffness values were 33.3 and 39.7 kPa, respectively with 9.62 and 12.8 kPa load resistance at 1 mm compression, respectively.

The combination of UV and heat post-cure greatly improved the stiffness. There are further improvements that can potentially be made both to the underlying material and stent design. We will perform rigorous parametric optimization to fully account for the trade-off between mechanical rigidity and the deployability in determining the optimal strut geometry and dimension. Incorporating a higher concentration of PLLA (increasing from 2% (wt./wt.) within B-Ink to 5 or 10 wt. %) would aid in improving overall bulk material properties while still maintaining predominately citric acid-based biomaterial degradation behaviors.

Figure 5A:
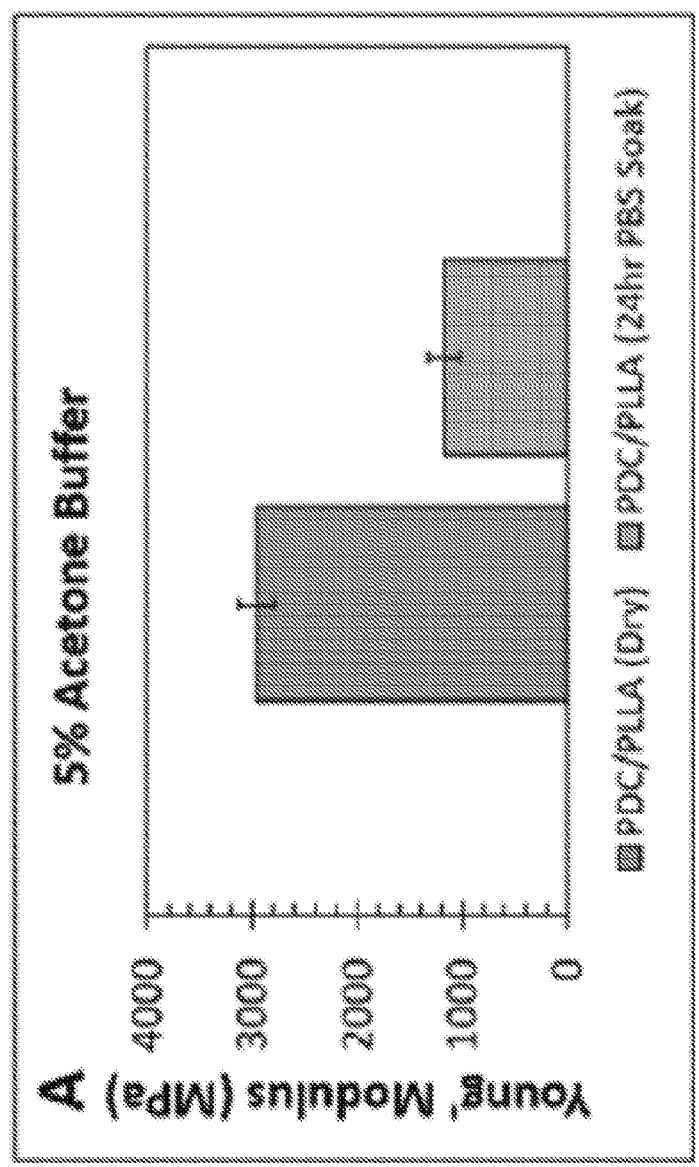
FIGS. 5A and 5B are graphs showing Young's Moduli and UTS values, respectively, for PDC/PLLA composites with 5% Acetone "buffer." Dry and 24 hr. hydration are shown.
Figure 5B:
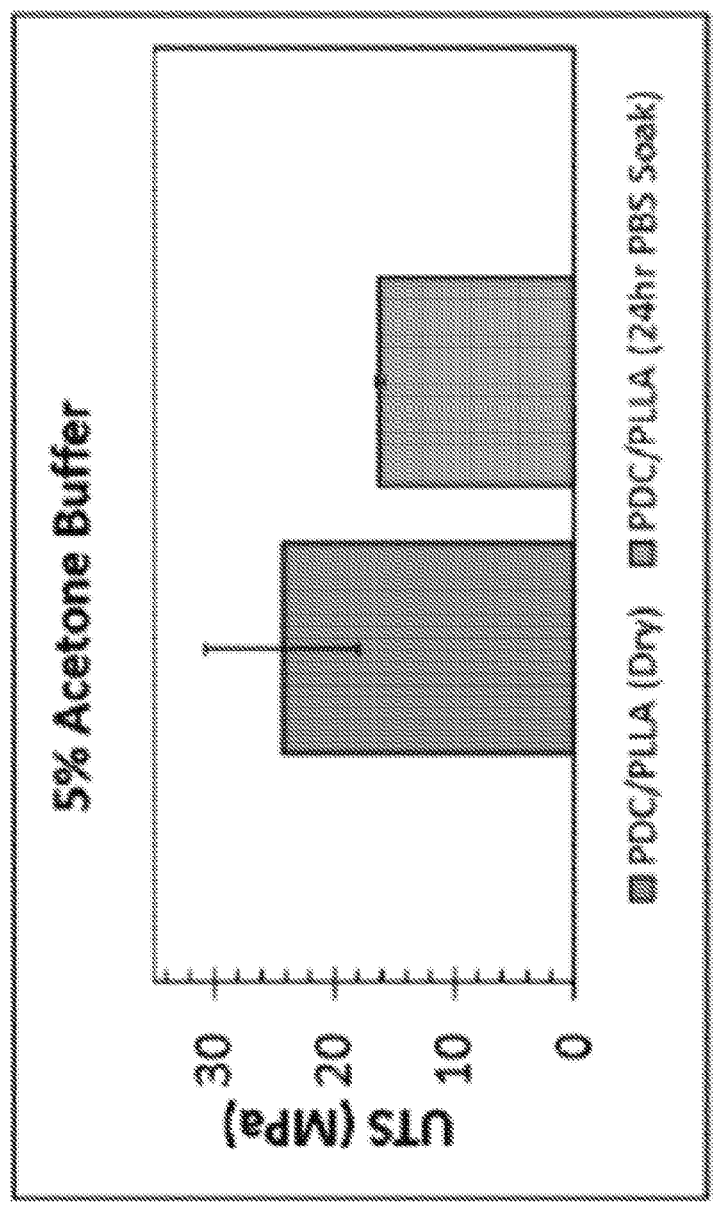
Figure 5C:
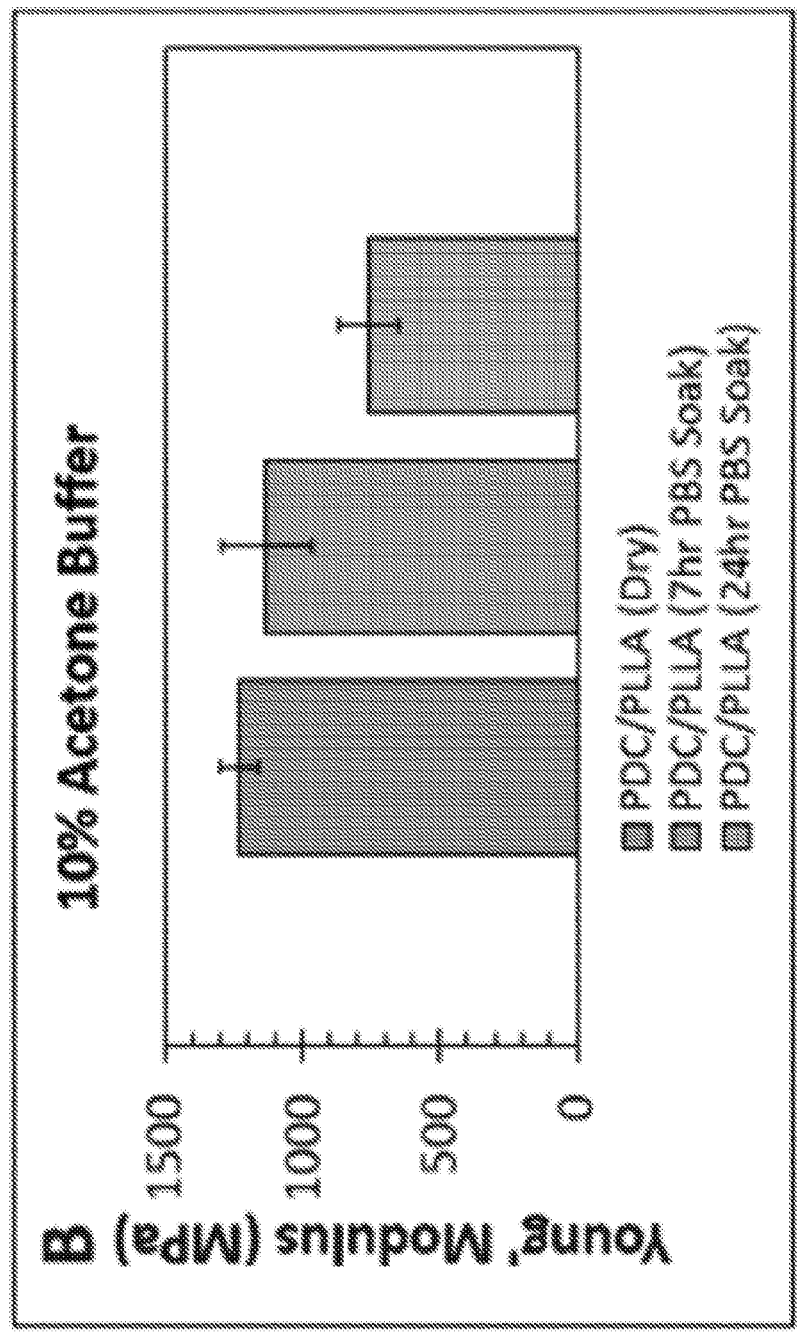
FIGS. 5C and 5D are graphs showing Young's Moduli and UTS values, respectively, for PDC/PLLA composites with 10% Acetone "buffer." The progressive effect of hydration is shown.
Figure 5D:
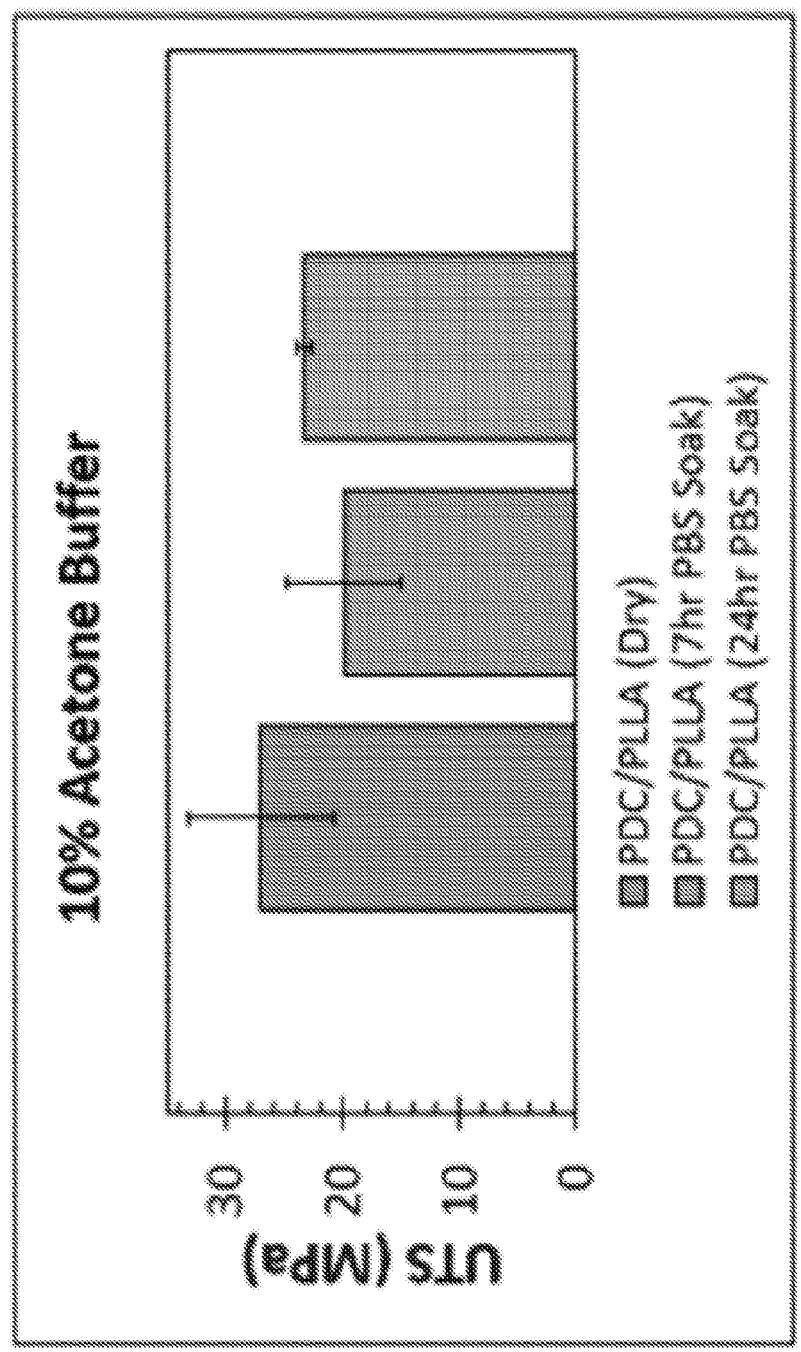
Figure 5E:
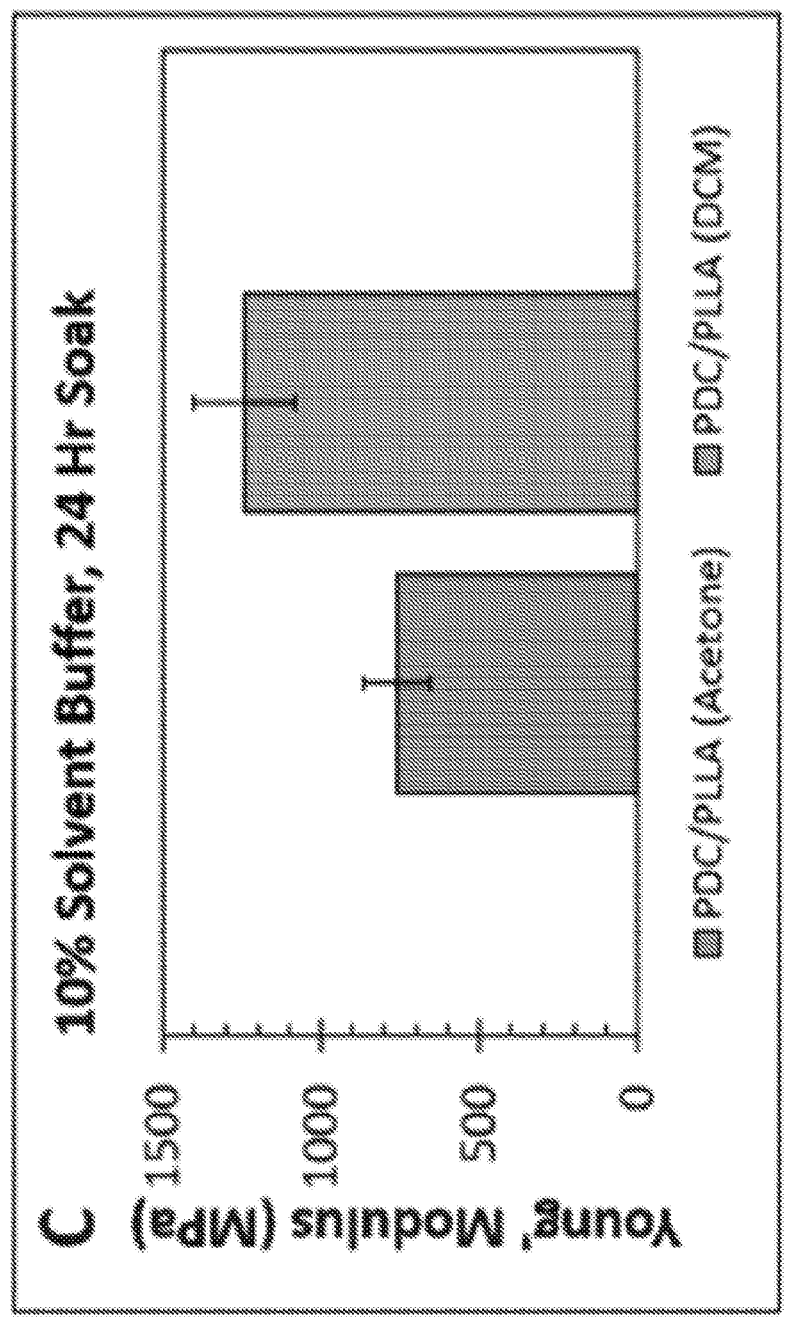
FIGS. 5E and 5F are graphs showing Young's Moduli and UTS values, respectively, for PDC/PLLA composites with 10% solvent "buffer." Difference in buffer solvent shown.
Figure 5F:
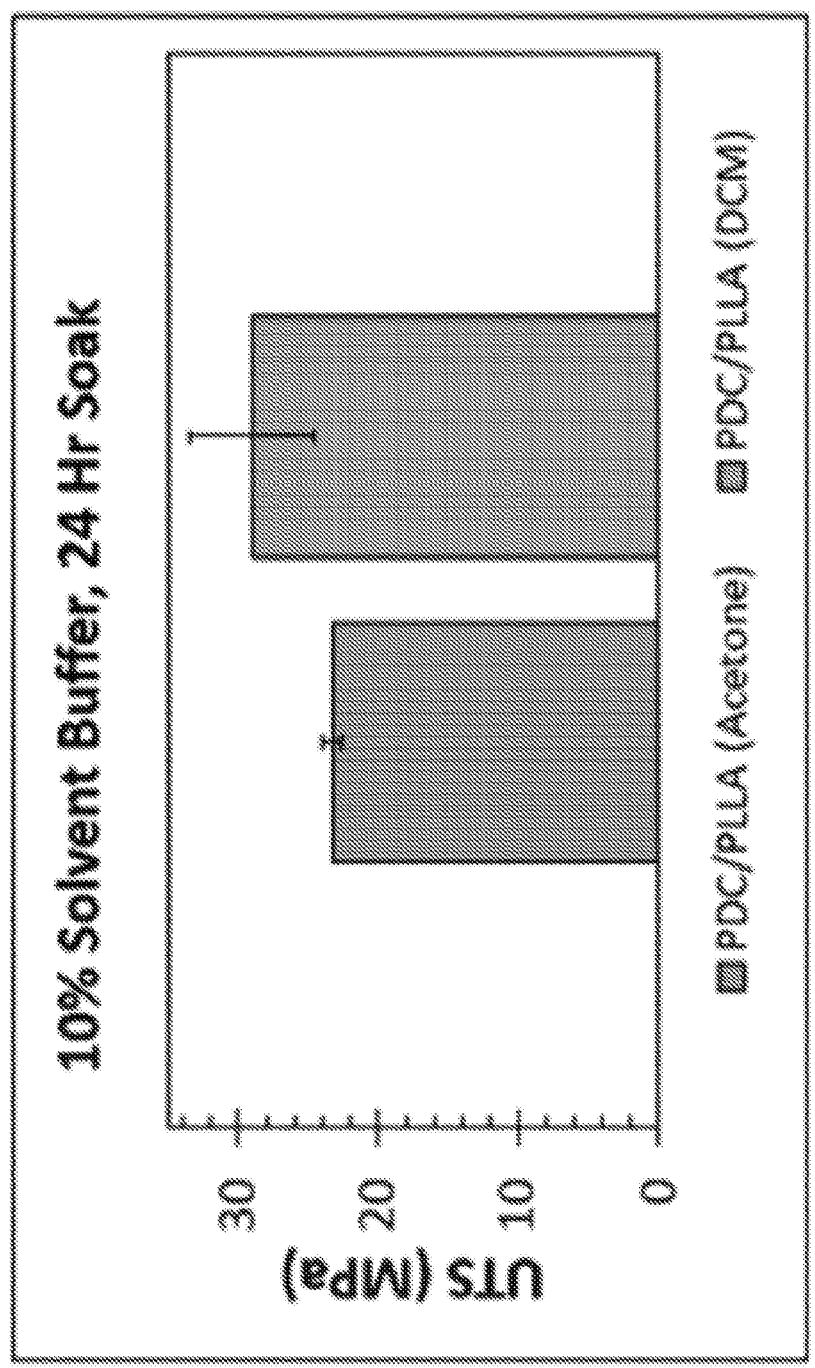

Bulk material properties are important for potential simulation and scaffold design. Table 1 below shows the bulk mechanical information (Young's Modulus, Yield, and UTS) for previously reported B-Ink iterations as well as current experimental tests with PLLA composites.[28,36] 1st reported photocrosslinked citric acid-based biomaterials possessed relatively small Young's modulus for both methacrylated POC and PDC (211 and 122 MPa, respectively). These mechanical properties could be affected by water and PBS. Hydrated samples were shown to have reduced stiffness and UTS than dry samples through dissolution of hydrogen bonding by water.[36] This effect is something that is necessary to account for and is reflected in the experimental data described herein. For current dogbone tensile testing, B-Ink iterations containing no thermal-induced radical generators were used for bulk materials testing. Several parameters were varied for bulk materials testing: post-processing conditions, secondary solvent, and secondary solvent mass concentration. POC samples were utilized to determine effect of post-processing methods. Samples were subjected to the thermally-induced phase separation with and without solvent exchange. This was performed to determine if dissolved PLLA was expressing itself within the 3D printed scaffold. Without solvent exchange, the Young's modulus is very soft, with a Young's Modulus of 74.02 MPa. In comparison to Wang, et. al., the POC mechanical properties are comparable to the hydrated samples, but even lower.[36] The composite POC/PLLA polymer showed a significant increase in Young's Modulus with the inclusion of the solvent exchange protocol from 74.02 MPa to 161.38 MPa. Solvent exchange was a necessary step for PLLA to have significant presence within the 3D geometry. For tensile samples, having thicker feature size than the scaffolds (500 um for the dogbone and 100 um for the BVSs, respectively), UV is not as effective in full post-cure of the fabricated samples. A massive increase in Young's Modulus and UTS was observed in changing post-cure methods to combination UV and heat, similar to the stent tests mentioned previously Table 1. With the inclusion of an 11-hour convection heating step, the Young's Modulus increased to 2.98 GPa. Potentially the full post-cure of the citric acid-based biomaterial allowed a larger degree of entanglements between both phases as well as removed any traces of solvent within the 3D geometry. For PLLA, 120° C. is also the crystallization temperature, so the time spent in convection heating allowed a strengthening of imbedded PLLA. A potential downside for use of mPOC for vascular scaffolds is that mPOC (even with infusion of PLLA) largely behaves elastically. This removes the possibility to deploy the scaffold via balloon expansion. Next, samples were tested to determine effect of PBS soak on the composites (FIG. 5). MPDC was chosen because this showed the largest amount of plastic deformation compared to mPOC. MPDC samples across the board when subjected to combination UV/heat post-cure and PBS soak showed significant drop in Young's Modulus and in UTS. In addition (FIGS. 5A and 5B), UTS and Young's Modulus reduction was observed with an increase in secondary "buffer" solvent solution (Acetone or Dichloromethane). For the "buffered" inks, the amount of reduction in UTS and Young's Modulus caused by hydration was significantly decreased (FIG. 5B). With a 5% buffer solvent, the modulus reduced by ~60% via hydration, with UTS being reduced by ~34% with hydration. With the inclusion of 10% "buffer" in solution, the mechanical property reduction via hydration was much less pronounced. The reduction in stiffness for hydrated 10% acetone samples was ~38%, and UTS was decreased by 12%. No hydrated set of samples exhibited as large of a Young's Modulus as the dry PLLA-infused POC. Significant increases in Young's Moduli and UTS were observed in comparison to the initially reported values by Wang et. al and Ware et. al.[28,36] With the change in buffer solvent (10% DCM), hydrated samples exhibited the highest Young's Modulus and UTS as compared to Acetone (1241 MPa and 29.04 MPa compared to 761.12 MPa and 23.29 MPa). This B-Ink iteration (with 10% DCM) appears to be the most appealing for potential vascular reopening applications of the samples tested (FIG. 5C).

TABLE 1

Bulk mechanical properties of methacrylated CBB materials. Table includes previously reported values as well as composite bulk material information.

| Sample Description | Young's Modulus (MPa) | Yield Stress (MPa) | UTS (MPa) |
| --- | --- | --- | --- |
| mPOC (UV exposure, dry)[36] | ~211.0 | 19.0 | 22.0 |
| mPDC (UV exposure, dry)[36] | ~122.0 | 11.0 | 14.0 |
| mPOC (UV exposure, wet)[36] | ~85.7 | 6.0 | 10.6 |

TABLE 1-continued

Bulk mechanical properties of methacrylated CBB materials.
Table includes previously reported values
as well as composite bulk material information.

| Sample Description | Young's Modulus (MPa) | Yield Stress (MPa) | UTS (MPa) |
| --- | --- | --- | --- |
| mPDC (UV exposure, wet)[36] | ~30.0 | 3.0 | 6.5 |
| mPOC (Combo exposure, dry)[28] | 652.7 | 10.0 | 14.3 |
| mPDC (Combo exposure, dry)[28] | 963.0 | 24.5 | 33.0 |
| mPOC (Combo exposure, wet)[28] | 112.2 | 2.5 | 6.5 |
| mPDC (Combo exposure, wet)[28] | 475.5 | 9.0 | 16.0 |
| mPOC (UV exp, w/o solvent exchange, dry) | 74.0 | N/A | 8.3 |
| mPOC (UV exp, w/ solvent exchange, dry) | 161.4 | N/A | 5.2 |
| mPOC (combo exposure, w/ solvent exchange dry) | 2981.9 | N/A | 28.3 |
| mPDC (5% Acetone, dry) | 2959.4 | 17.5 | 24.3 |
| mPDC (5% Acetone, PBS soak) | 1175.8 | 14.5 | 16.1 |
| mPDC (10% Acetone, dry) | 1230.4 | 25.1 | 26.4 |
| mPDC (10% Acetone, 7 hr PBS) | 1130.4 | 17.7 | 19.94 |
| mPDC (10% Acetone, 24 hr PBS) | 761.1 | 21.0 | 23.3 |
| mPDC (10% DCM, PBS soak) | 1241.0 | 23.3 | 29.0 |

Biocompatibility and Degradation of BVS

Figure 6:
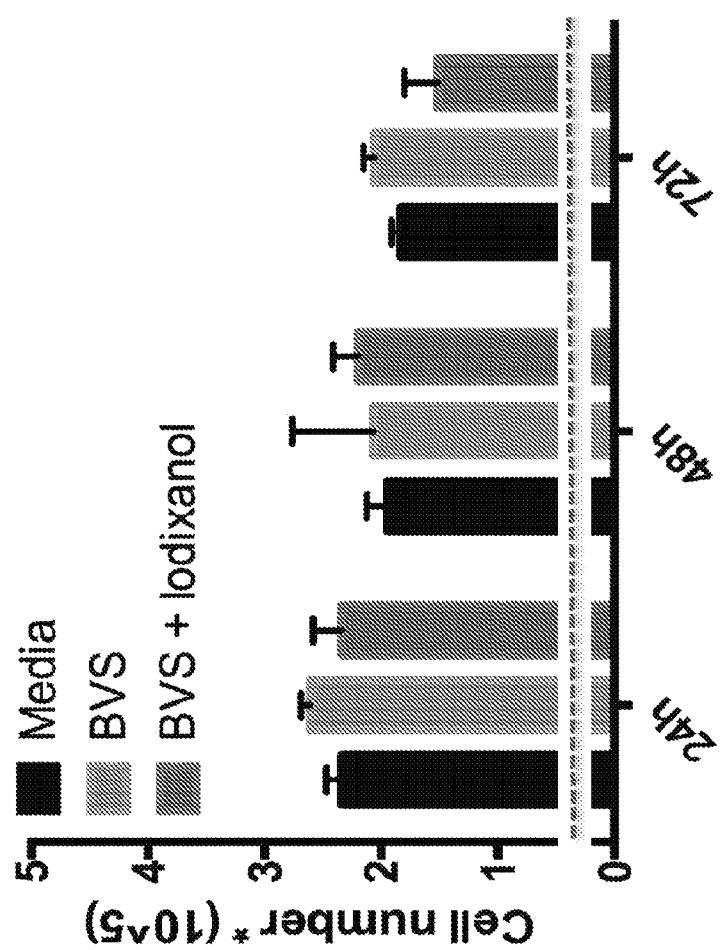
FIG. 6 is a graph illustrating that human umbilical vein endothelial cells (HUVECs) exposed to extracts of BVS and BVS with iodixanol at 24, 48 and 72 hours show good proliferation during 72 hours of culture (dashed line shows the initial cells seeding number).

Human umbilical vein endothelial cells (HUVECs) were cultured for 3 days in extracts of BVS and BVS with 5.5% iodixanol, which were collected at 24, 48 and 72 hours after incubating the BVSs in cell culture media. HUVECs showed similar proliferation and spreading as HUVECSs that were cultured in fresh media FIG. 6.

Figures 7A, 7B:
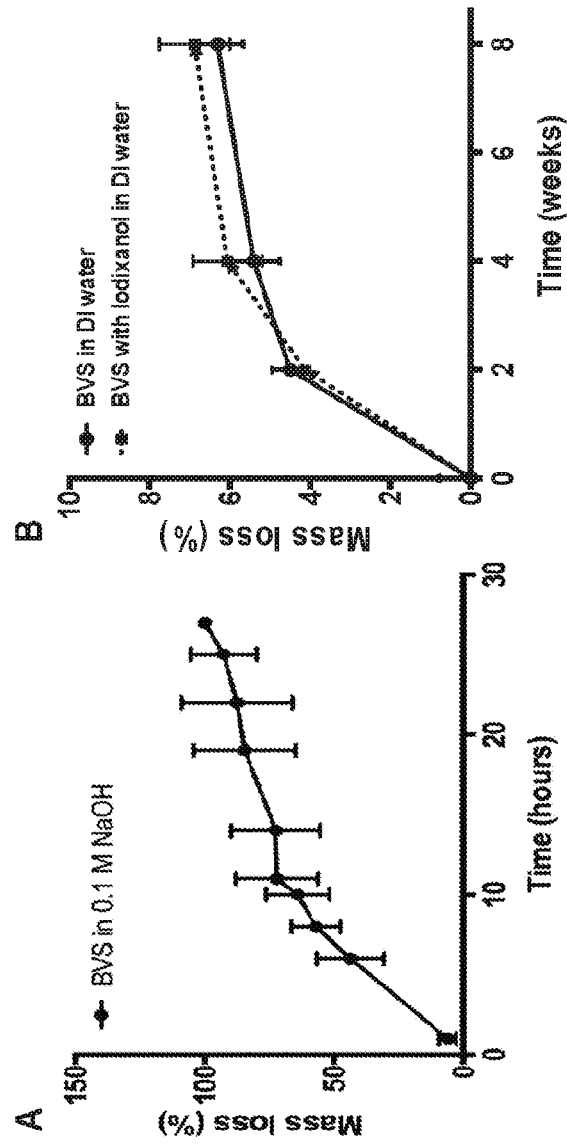
FIG. 7A is a graph showing accelerated BVS degradation in 0.1 M NaOH at 37° C.
FIG. 7B is a graph showing degradation of BVS in DI water and BVS with 5.5% iodixanol in deionized (DI) water at 37° C.

The complete degradation of BVS was verified via an accelerated degradation test (FIG. 7A). 7.2%±2.1 of the BVS degraded in 8 weeks when they were incubated in deionized water at 37° C. (FIG. 7B). Also, BVS with 5.5% iodixanol showed a similar degradation kinetics to BVS in DI water, 6.8±0.8% of BVS with iodixanol was degraded in 8 weeks.

Evaluation of the Citrate-Based BVS with 100 μm Strut Thickness In Vivo

Figure 8:
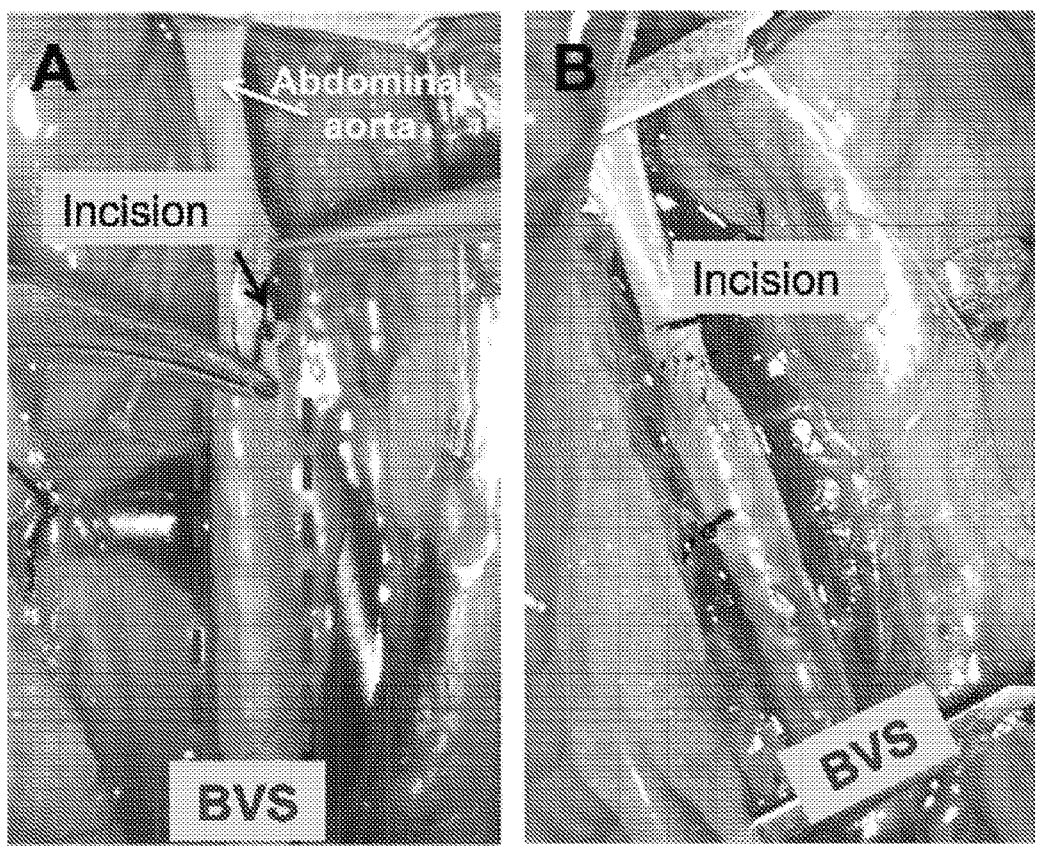
FIGS. 8A and 8B are images of a citrate-based BVS deployed in the rat aorta.

The BVS with 100 μm strut thickness was tested in using a rat abdominal aorta stenting procedure.31 The BVS (3 mm in diameter, 12 mm in length) was successfully deployed (FIG. 8).

Figure 9:
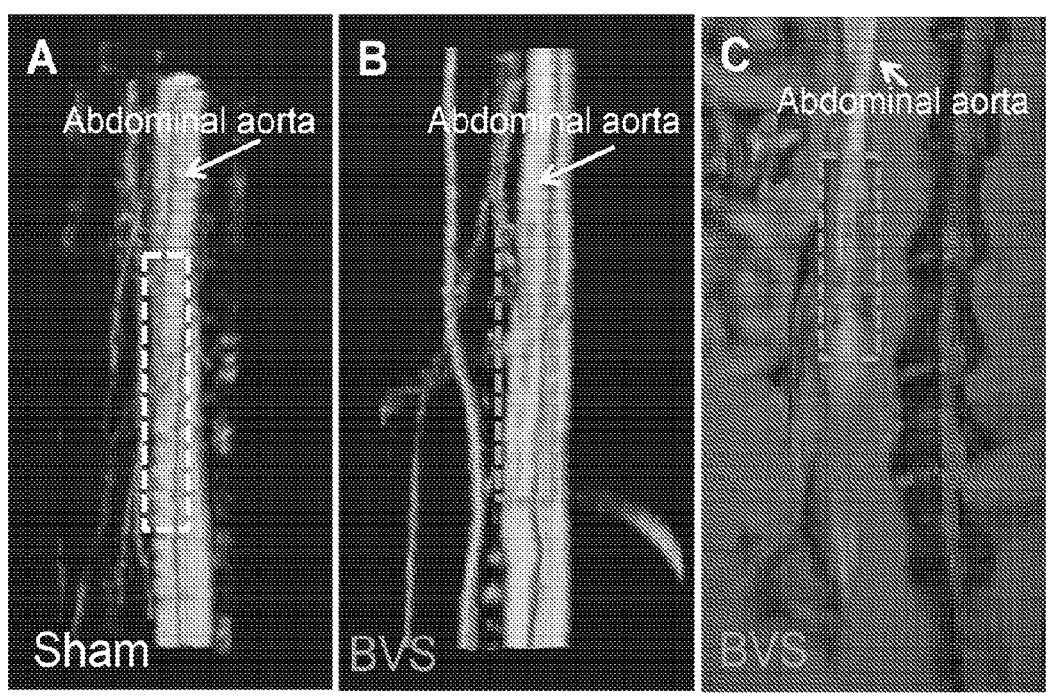
FIGS. 9A and 9B are magnetic resonance angiograms of sham- and BVS-implanted areas, respectively, confirming blood flow.
FIG. 9C is an MRI image of the BVS implant shown in FIG. 7B.
Figure 10A:
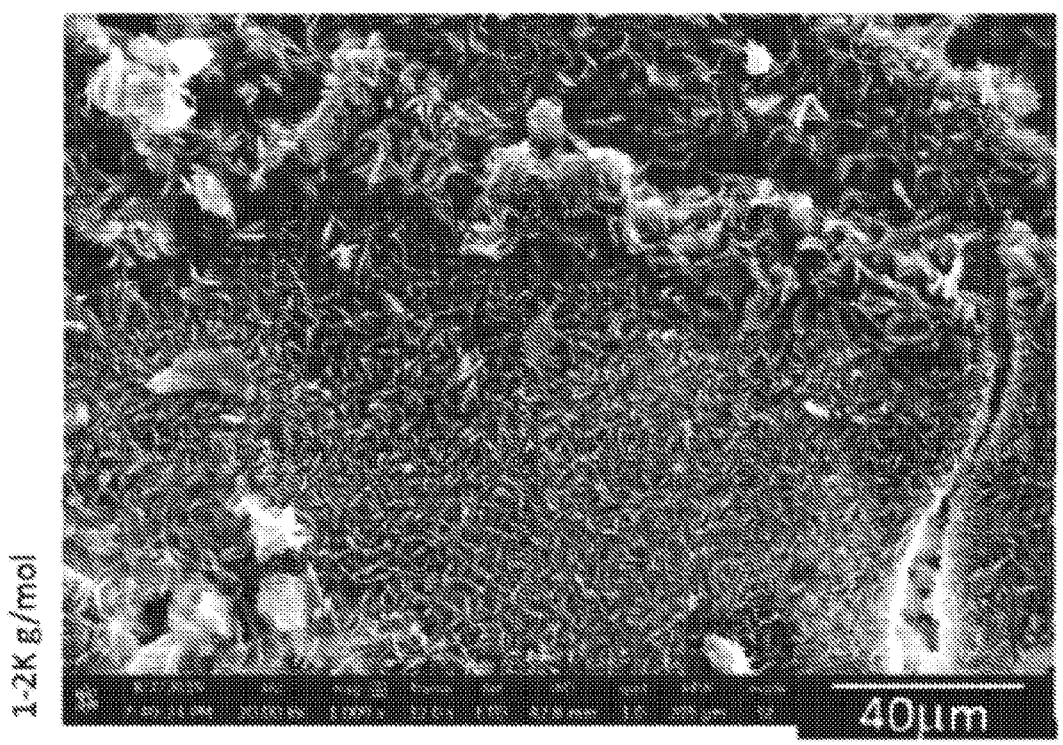
FIGS. 10A and 10B are high resolution images of 30 wt/vol % PLLA/TFE scaffolds from 1-2K g/mol at 40 μm (FIG. 10A) and 50 μm (FIG. 10B) magnification of the same region.
Figure 10B:
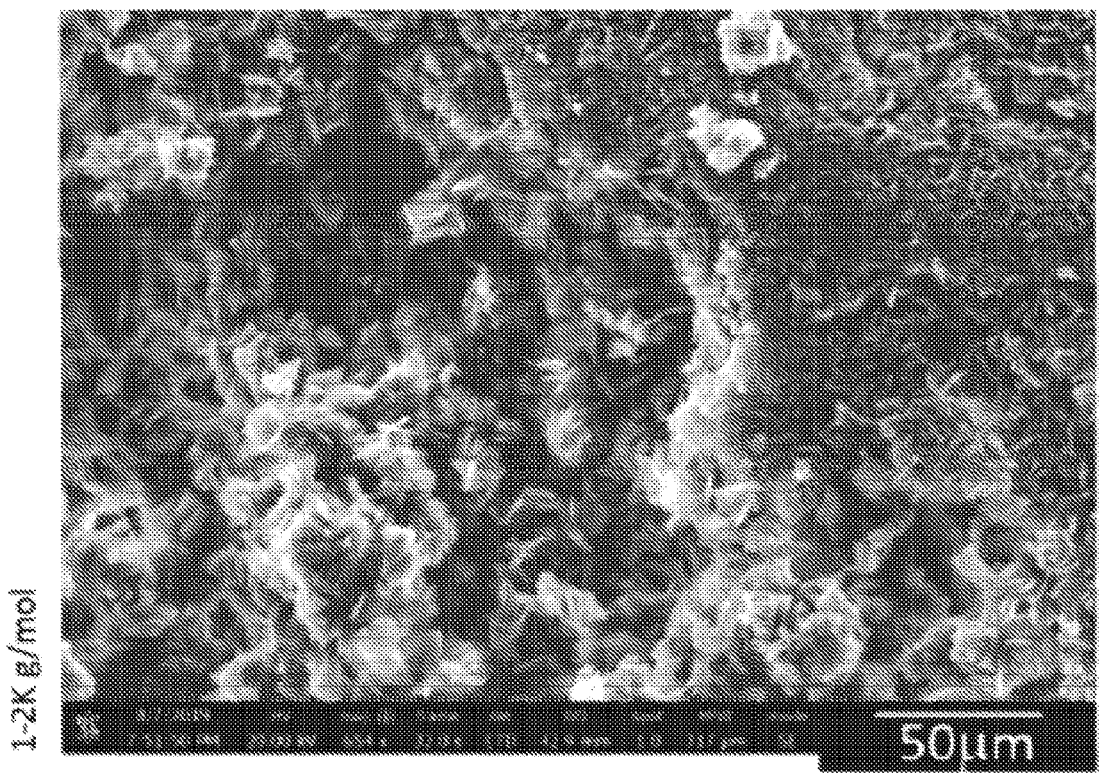
Figure 10C:
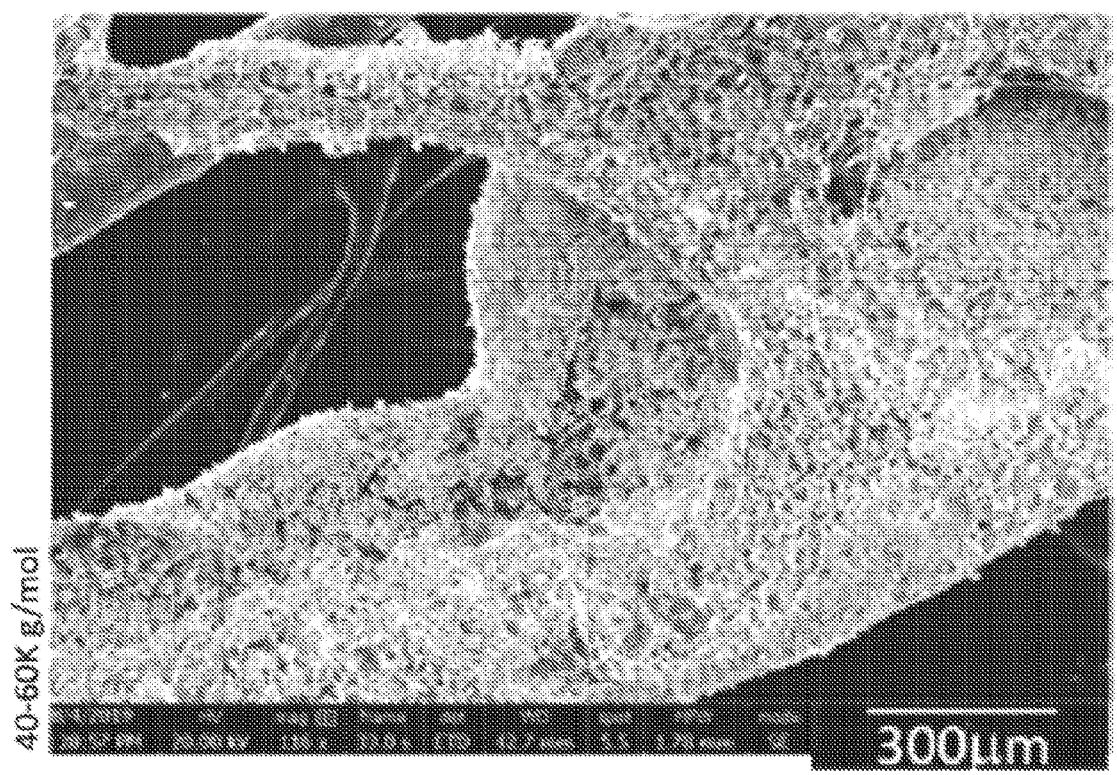
FIGS. 10C and 10D are high resolution images of 10 wt/vol % PLLA/TFE scaffolds from 40-60K g/mol at 300 μm (FIG. 10C) and 50 μm (FIG. 10D) magnification of the same region. The images show that micro-nano scale-like structures predominated the obtained scaffolds.
Figure 10D:
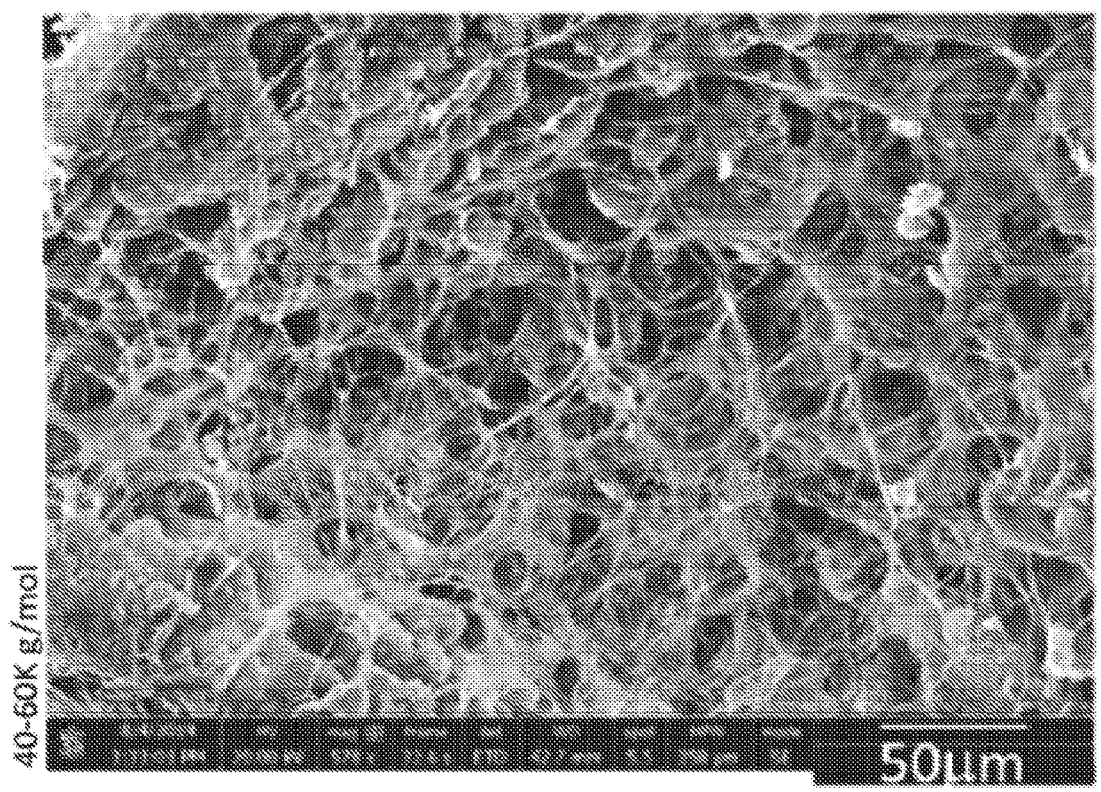

Animals without (FIG. 9A) and with (FIGS. 9B and 9C) BVS were imaged via magnetic resonance imaging (MRI) after 1 week of the implantation. The magnetic resonance angiogram of the BVS implanted area resulted in similar blood flow velocities with the corresponding region in the sham animal (FIGS. 9B and 9C). The mid-section of the abdominal aorta that contained the BVS showed a similar average blood velocity (4.5 cm/s) over the cardiac cycle to sham animal for the corresponding same area (5.7 cm/s). The blood flow rates were 4.07 ml/min for the mid-section of the aorta with the BVS and 4.18 ml/min for the mid-section of the aorta in the sham animal.

Example 2

This example describes the effect of PLLA molecular weight and the primary PLLA solvent on bioresorbable vascular scaffolds.

Upon full use of the 80-100K g/mol PLLA, it was revealed that the listed molecular weight was inaccurate. During the passing years, the molecular weight had been reduced to an intermediate range. Attempts were made to approximate the actual molecular weight. PLLA MPDC was combined with Irgacure 819 photoinitiator (2.2 wt. %) and 3% ethyl 4 dimethylamino benzoate. A 10% (wt./vol.) of poly (L) lactic acid (PLLA) within tetrahydrofuran (THF) or trifluoroethanol (TFE) was incorporated into the ink. PLLA used in this study was varied in MW value (1-2K, 40-60K, and 80-100K). Incorporated mass percentage of PLLA and THF (or TFE) accounted for ~2% and 18%, respectively. Fabricated tensile dogbones were immediately placed into a −80° C. freezer for 1 hour followed by a −20° C. freezer to induce nanofiber formation of the PLLA within the fabricated BVSs. The BVSs were then placed within deionized (DI) water for 24 hours to allow solvent exchange with THF. Following the solvent-exchange, the BVSs were subjected to a combination post-polymerization: ultraviolet flood irradiation and 120° C. heating. Ultraviolet flood irradiation was performed via FEI flood exposure system for three minutes. Heat exposure was performed for 10-12 hours.

Prior to combining within mPDC prepolymer ink, 80-100K g/mol PLLA could not be dissolved within THF solvent, with 40-60K PLLA only having partial dissolution within THF. Only the low molecular weight PLLA (1-2K g/mol) could be completely dissolved within THE at 10 wt/vol %. Low MW PLLA could be dissolved up to 20 wt/vol %. From these tests it was determined that the PLLA MW from the previously reported tests was sub 50K g/mol. In testing with TFE, all molecular weights could be dissolved. Upon addition to the B-ink (mPDC and photoinitiator solution) with 10 wt. % secondary solvent (DCM), the 40-60K g/mol could only be partially dissolved and the low 1-2K g/mol could be fully dissolved. Further testing showed that 1-2K g/mol could be incorporated up to 7 wt. % (or a PLLA/TFE solution of 30 wt/vol %). FIG. 2 shows the differences in microstructure between the PLLA scaffolding obtained from the PLLA/TFE solution (not B-Ink composite). Scaffolds obtained from the 30 wt/vol % appeared to be comprised mostly of micro-nano sheets. Being of small molecular weight, the structures could be easily broken. Medium molecular weight (40-60K g/mol) 10 wt/vol % with TFE appeared to be comprised of micro-nanofibrous structures, as expected from the literature. In addition to the micro-nano fibrous structures, the planar structures seen in lower molecular weight was also observed.

Next, composite mechanical properties were measured. As high MW (80-100K g/mol) PLLA did not dissolve well in the ink, that particular composite was not tested. While medium MW (40-60K g/mol) PLLA was partially dissolved, only a small solidified portion remained undissolved. As such, the printed composite was tested. Low MW PLLA (1-2K g/mol) was integrated into the ink and tested at 20 wt/vol % and 30 wt/vol %. The average Young's Modulus values for the printed 24 hour soaked composite inks are shown in Table 2.

TABLE 2

Young's Modulus information for newly tested 3D printed composites in relation to PLLA molecular weight and concentration. MPDC (polymer only) mechanical properties are shown as reference. All 'Soaked" samples were allowed 24 hours soaking in PBS prior to tensile testing.

| Sample Description | Young's Modulus (MPa) |
| --- | --- |
| mPDC (Polymer-Only, Combo exposure, Dry)[28] | 963.0 ± 48.6 |
| mPDC (Polymer-Only, Combo exposure, PBS Soaked)[28] | 475.5 ± 45.9 |

TABLE 2-continued

Young's Modulus information for newly tested 3D printed composites in relation to PLLA molecular weight and concentration. MPDC (polymer only) mechanical properties are shown as reference. All 'Soaked" samples were allowed 24 hours soaking in PBS prior to tensile testing.

| Sample Description | Young's Modulus (MPa) |
|---|---|
| mPDC, TFE, DCM (5%), med MW PLLA (40-60K g/mol, 2.3 wt. %, Dry) | 1332.3 ± 30.5 |
| mPDC, TFE, DCM (5%), med MW PLLA (40-60K g/mol, 2.3 wt. %, Soaked) | 915.0 ± 65.0 |
| mPDC, TFE, DCM (10%), low MW PLLA (1-2K g/mol, 4.6 wt. %, Dry) | 1662.7 ± 50.4 |
| mPDC, TFE, DCM (10%), low MW PLLA (1-2K g/mol, 4.6 wt. %, Soaked) | 964.7 ± 24.1 |
| mPDC, TFE, DCM (10%), low MW PLLA (1-2K g/mol, 6.9 wt. %, Dry) | 1710.3 ± 65.0 |
| mPDC, TFE, DCM (10%), low MW PLLA (1-2K g/mol, 6.9 wt. %, Soaked) | 908.4 ± 41.3 |

From these tests, similar properties to those described above were obtained. The medium MW PLLA ink with much less weight percentage of the composite ink possessed the second highest average Young's Modulus. The low MW PLLA inks had a maximum Young's Modulus of 4.6 wt. %. While more PLLA could be dispersed (up to 6.9 wt %), this did not lead to a higher Modulus value. When comparing the types of PLLA microstructure being formed from the various molecular weights, as shown in FIG. 10, the low MW PLLA yielded micro-nano size scale-like microstructure and an overall easily broken granular scaffold. Conversely, the medium MW PLLA yielded the expected micro-nano fibrous architecture. The internal microstructure in the PLLA/mPDC composite scaffolds containing low MW PLLA could reasonably be assumed to be agglomerations of discrete particles within the mPDC matrix. Larger weight concentrations of PLLA may allow for improvement of mechanical stiffness. A lower concentration of medium MW PLLA was needed to obtain similar mechanical properties, which implies that the micro-nano fibrous architectures are present within the structure. A PLLA with a molecular weight around 40K g/mol may be used to allow a greater degree of dispersion of PLLA and potentially a higher concentration (by weight) of PLLA within the composite ink.

Example 3

This example describes self-expansion tests for BVS deployment.

Figure 11A:
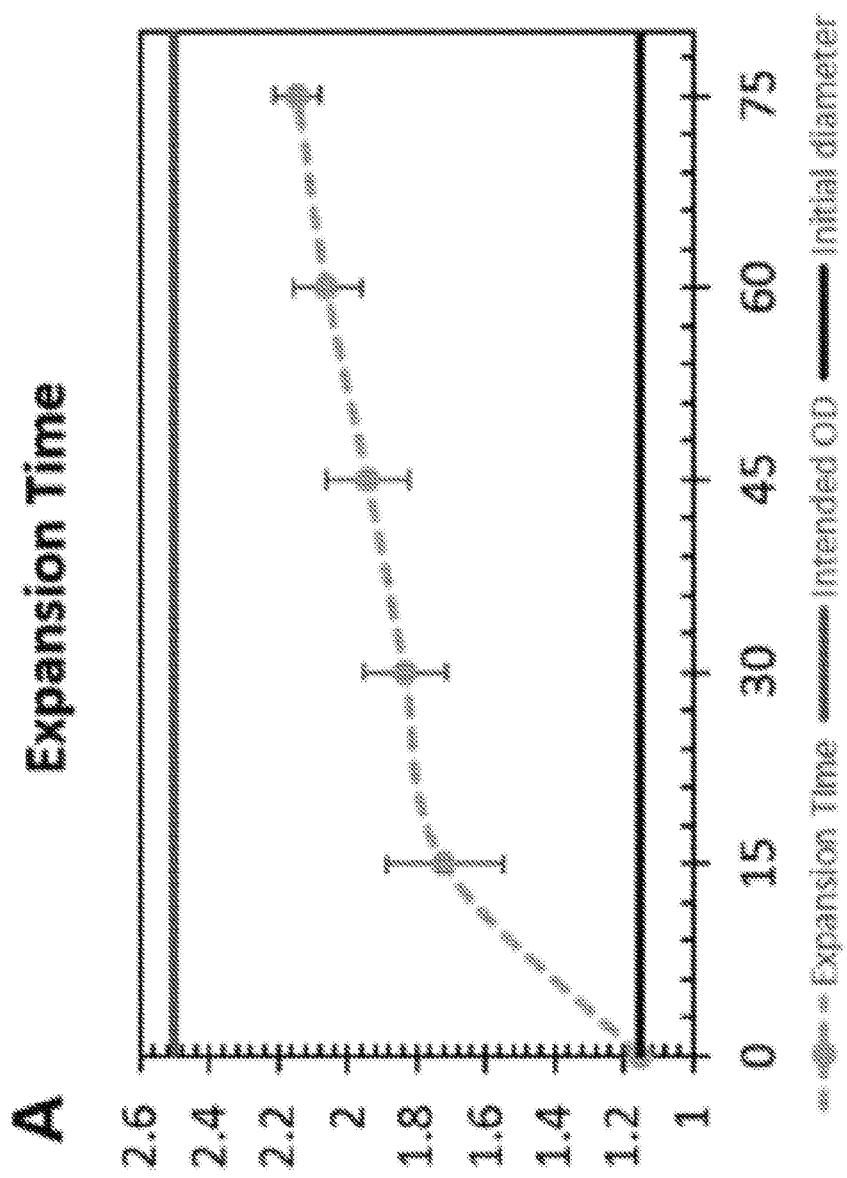
FIG. 11A is a graph showing rehydrated expansion of BVS upon removal from Teflon tubing constraint. The dashed line indicates extension time, the top solid line indicates intended OD, and the bottom solid line indicates initial diameter.
Figure 11B:
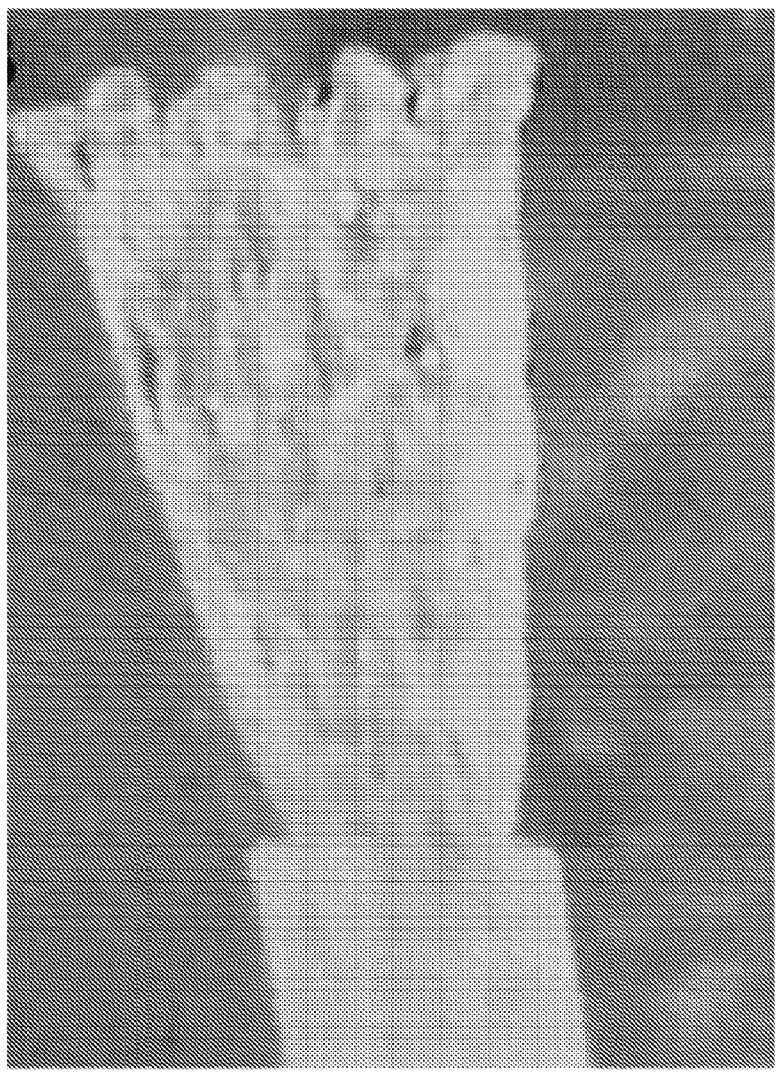
FIG. 11B is an image of partially uncovered BVS within Teflon tubing.

BVSs were fabricated with an OD of 2.5 mm and 16 mm length in the arrowhead design with 100 µm strut thickness and 250 µm strut width. Stents fabricated with mPOC polymer and post-cured for two minutes via UV exposure were soaked in PBS for two hours and crimped around a 0.7 mm wire. Crimped BVSs were kept in the crimped position for 90 minutes to dry and allow for the BVS to remain in position. Crimped BVSs were then placed into a Teflon tubing with ID of 1 mm. Once placed within the tubing, the tube/BVS was placed in heated PBS (40° C.). A wire having a 0.9 mm diameter was used to push the BVS from the tubing. The rehydrated expansion of the BVS with respect to time is shown in FIG. 11. Some plastic deformation occurred during crimping, but the BVS would return ~88% within 1 minute and 15 seconds of removal from the tubing constraint.

Example 4

This example examines the solubility of PLLA within a mPDC matrix with respect to molecular weight.

In order to maximize the amount of PLLA in the mPDC 3D printing material at higher molecular weights (average MW=50,000 and 90,000 g/mol), solubility tests were performed to determine the highest mass percentage of PLLA within the composite B-Ink. Tests were initially performed with a single primary solvent trifluoroethanol (TFE). The solubility tests were performed by preparing inks containing a set mPDC mass concentration of 10%, PLLA concentration varied from 0.5% to 10%, and the remainder of mass was TFE. The vials of composite prepolymer was then placed under a fumehood to allow TFE to evaporate from the mixture. The TFE was allowed to evaporate from the mixture until the PLLA had heavily separated from the mixture. Two molecular weights were used in these solubility tests (as labeled): 40,000-60,000 g/mol and 80,000-100,000 g/mol.

Figures 12A, 12B:
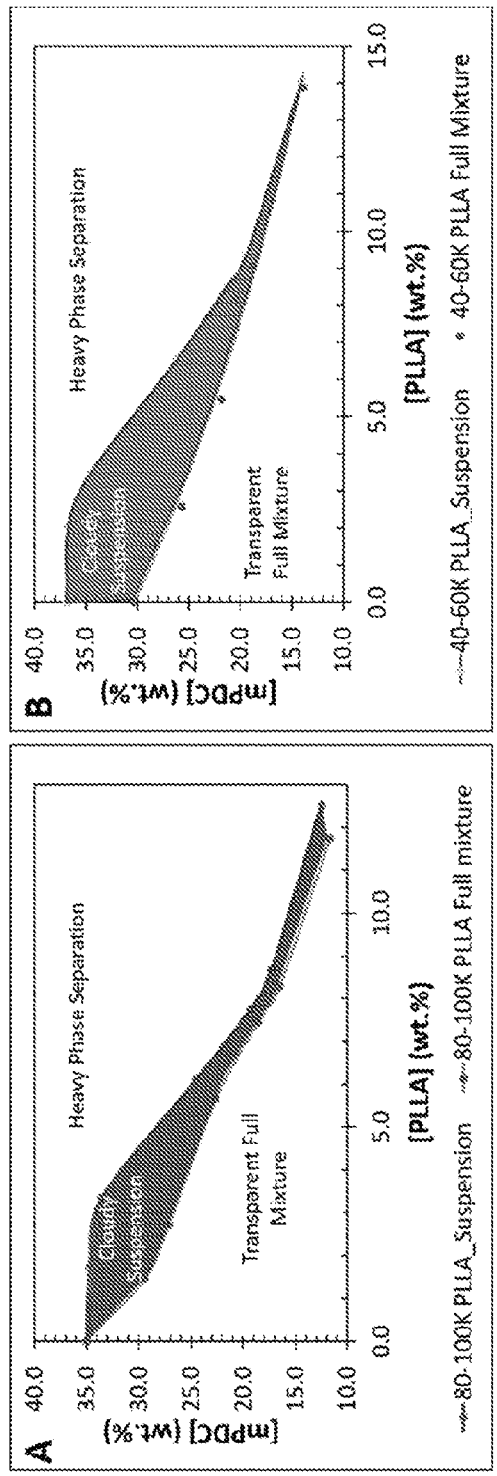
FIG. 12A is a phase diagram of 80-100 kg/mol PLLA mixture within mPDC and trifluoroethanol (TFE).
FIG. 12B is a phase diagram of 40-60 kg/mol PLLA within mPDC and TFE. mPDC and PLLA concentrations by weight are presented in the graphs. The remaining mass percentage in the mixtures is TFE.

The phase diagrams of the two tested PLLA molecular weights are shown in FIG. 12. The mixtures with varying concentration of TFE had three distinct phase regions: full mixture, suspension, and heavy phase separation. The full mixture region appeared as a transparent clear liquid, which is stable at room temperature. The suspension regions (represented in shaded color in FIG. 12) exhibited a cloudy translucent appearance but were stable at room temperature. The heavy phase separation region just beyond the Suspension region indicated that some portion of PLLA will not integrate completely with the suspension. Further evaporation of TFE would create a full PLLA/mPDC phase separation, where the two polymers will not mix. These regions can be shifted either through added heat (approximately 60° C.) or potentially through a co-solvent. A co-solvent is necessary to have significant PLLA (of either tested MW) be soluble in fabrication inks containing greater than 35 wt. % of mPDC.

REFERENCES

The following references, some of which are cited above by number, are herein incorporated by reference in their entireties.

1. Iqbal J, Onuma Y, Ormiston J, Abizaid A, Waksman R, Serruys P. Bioresorbable scaffolds: Rationale, current status, challenges, and future. Eur Heart J. 2014; 35(12): 765-76.
2. Mahoney E M, Wang K, Cohen D J, Hirsch A T, Alberts M J, Eagle K, et al. One-Year Costs in Patients With a History of or at Risk for Atherothrombosis in the United States. Circ Cardiovasc Qual Outcomes. 2008 Sep. 1; 1(1):38-45.
3. Rogers C, Edelman E R. Endovascular Stent Design Dictates Experimental Restenosis and Thrombosis. Circulation. 1995 Jun. 15; 91(12):2995-3001.
4. Hwang C-W, Wu D, Edelman E R. Physiological Transport Forces Govern Drug Distribution for Stent-Based Delivery. Circulation. 2001 Jul. 31; 104(5):600-5.
5. Murphy T P, Cutlip D E, Regensteiner J G, Mohler E R, Cohen D J, Reynolds M R, et al. Supervised Exercise Versus Primary Stenting for Claudication Resulting From Aortoiliac Peripheral Artery Disease: Six-Month Outcomes From the Claudication: Exercise Versus Endoluminal Revascularization (CLEVER) Study. Circulation. 2012 Jan. 3; 125(1):130-9.
6. Rocha-Singh K J, Jaff M R, Crabtree T R, Bloch D A, Ansel G. Performance goals and endpoint assessments for clinical trials of femoropopliteal bare nitinol stents in patients with symptomatic peripheral arterial disease. Catheter Cardiovasc Interv. 2007 May 1; 69(6):910-9.
7. Dake M D, Ansel G M, Jaff M R, Ohki T, Saxon R R, Smouse H B, et al. Paclitaxel-Eluting Stents Show Superiority to Balloon Angioplasty and Bare Metal Stents in Femoropopliteal Disease: Twelve-Month Zilver PTX Randomized Study Results. Circ Cardiovasc Interv. 2011 Oct. 1; 4(5):495-504.
8. Laird J R, Katzen B T, Scheinert D, Lammer J, Carpenter J, Buchbinder M, et al. Nitinol Stent Implantation Versus Balloon Angioplasty for Lesions in the Superficial Femoral Artery and Proximal Popliteal Artery: Twelve-Month Results From the RESILIENT Randomized Trial. Circ Cardiovasc Interv. 2010 Jun. 1; 3(3):267-76.
9. Davaine J-M, Azéma L, Guyomarch B, Chaillou P, Costargent A, Patra P, et al. One-year Clinical Outcome after Primary Stenting for Trans-Atlantic Inter-Society Consensus (TASC) C and D Femoropopliteal Lesions (The STELLA "STEnting Long de L'Artère fémorale superficielle" Cohort). Eur J Vasc Endovasc Surg. 2012 October; 44(4):432-41.
10. Kang S-HH, Park K T W T, Kang D-Y Y, Lim W-H H, Park K T W T, Han J-K K, et al. Biodegradable-polymer drug-eluting stents versus bare metal stents versus durable-polymer drug-eluting stents: A systematic review and bayesian approach network meta-analysis. J Am Coll Cardiol. 2014; 62(2):B251.
11. Bosiers M, Cagiannos C, Deloose K, Verbist J, Peeters P. Drug-eluting stents in the
12. management of peripheral arterial disease. Vasc Health Risk Manag. 2008; 4(43):553. Sabaté M, Windecker S, Iñiguez A, Okkels-Jensen L, Cequier A, Brugaletta S, et al. Everolimus-eluting bioresorbable stent vs. durable polymer everolimus-eluting metallic stent in patients with ST-segment elevation myocardial infarction: Results of the randomized ABSORB ST-segment elevation myocardial infarction-TROFI II trial. Eur Heart J. 2016; 37(3):229-40.
13. Serruys P W, Chevalier B, Dudek D, Cequier A, Carri D, Iniguez A, et al. A bioresorbable everolimus-eluting scaffold versus a metallic everolimus-eluting stent for ischaemic heart disease caused by de-novo native coronary artery lesions (ABSORB II): An interim 1-year analysis of clinical and procedural secondary outcomes from. Lancet. 2015; 385(9962):43-54.
14. Ormiston J A, Serruys P W S. Bioabsorbable Coronary Stents. Circ Cardiovasc Interv. 2009 Jun. 1; 2(3):255-60.
15. Peuster M, P W, Brugmannb M, Ehlerdinga K, Seidlera C, Finka H, et al. A novel approach to temporary stenting: degradable cardiovascular stents produced from corrodible metal—results 6-18 months after implantation into New Zealand white rabbits. Heart. 2001 Nov. 1; 86(5):563-9.
16. Zartner P, Buettner M, Singer H, Sigler M. First biodegradable metal stent in a child with congenital heart disease: Evaluation of macro and histopathology. Catheter Cardiovasc Interv. 2007 Feb. 15; 69(3):443-6.
17. Hermawan H, Dubé D, Mantovani D. Developments in metallic biodegradable stents ☆. Acta Biomater. 2010 May; 6(5):1693-7.
18. Purnama A, Hermawan H, Mantovani D. Biodegradable Metal Stents: A Focused Review on Materials and Clinical Studies. J Biomater Tissue Eng. 2014 Nov. 1; 4(11):868-74.
19. Sing N B, Mostavan A, Hamzah E, Mantovani D, Hermawan H. Degradation behavior of biodegradable Fe35Mn alloy stents. J Biomed Mater Res Part B Appl Biomater. 2015 April; 103(3):572-7.
20. McNeilly J D, Heal M R, Beverland I J, Howe A, Gibson M D, Hibbs L R, et al. Soluble transition metals cause the pro-inflammatory effects of welding fumes in vitro. Toxicol Appl Pharmacol. 2004 April; 196(1):95-107.
21. Manke A, Wang L, Rojanasakul Y. Mechanisms of Nanoparticle-Induced Oxidative Stress and Toxicity. Biomed Res Int. 2013; 2013:1-15.
22. Kassimis G, Spiliopoulos S, Katsanos K, Tsetis D, Krokidis M E. Bioresorbable scaffolds in peripheral arterial disease. Expert Rev Cardiovasc Ther. 2014; 12(4):443-50.
23. Eberhart R C, Su S-H, Nguyen K T, Zilberman M, Tang L, Nelson K D, et al. Review: Bioresorbable polymeric stents: current status and future promise. J Biomater Sci Polym Ed. 2003 January; 14(4):299-312.
24. Gogas B D, Farooq V, Onuma Y, Serruys P W. The ABSORB bioresorbable vascular scaffold: an evolution or revolution in interventional cardiology. Hell J Cardiol. 2012; 53(4):301-9.
25. Alexy R D, Levi D S. Materials and Manufacturing Technologies Available for Production of a Pediatric Bioabsorbable Stent. Biomed Res Int. 2013; 2013:1-11.
26. Seth A, Ravisekar V, Kaul U. Use of "Guideliner" catheter to overcome failure of delivery of Absorb™ Bioresorbable Vascular Scaffold in calcified tortuous coronary lesions: Technical considerations in "Real World Patients." Indian Heart J. 2014 July; 66(4):453-8.
27. Ware H O T, Farsheed A C, van Lith R, Baker E, Ameer G, Sun C. Process development for high-resolution 3D-printing of bioresorbable vascular stents. In: von Freymann G, Schoenfeld W V., Rumpf R C, editors. SPIE Proceedings. 2017. p. 101150N.
28. Ware H O T, Farsheed A C, Akar B, Duan C, Chen X, Ameer G, et al. High-speed on-demand 3D printed bioresorbable vascular scaffolds. Mater Today Chem. 2018; 7:25-34.
29. van Lith R, Baker E, Ware H, Yang J, Farsheed A C, Sun C, et al. 3D-Printing Strong High-Resolution Antioxidant Bioresorbable Vascular Stents. Adv Mater Technol. 2016 December; 1(9):1600138.
30. Serrano M C, Carbajal L, Ameer G A. Novel Biodegradable Shape-Memory Elastomers with Drug-Releasing Capabilities. Adv Mater. 2011 May 17; 23(19):2211-5.
31. Langeveld B, Roks A J M, Tio R A, van Boven A J, van der Want J J L, Henning R H, et al. Rat Abdominal Aorta Stenting: A New and Reliable Small Animal Model for In-Stent Restenosis. J Vasc Res. 2004 Nov. 19; 41(5):377-86.
32. Sun C, Fang N, Wu D and ZX. Projection microstereolithography using digital micro-mirror dynamic mask. Sensors and Actuators. Physical. 2005; 121(1):113-20.
33. Process [Internet]. 2018 [cited 2019 Jan. 1]. Available from: 5 https://www.carbon3d.com/process/
34. Webb A R, Kumar V A, Ameer G A. Biodegradable poly(diol citrate) nanocomposite elastomers for soft tissue engineering. J Mater Chem. 2007; 17(9):900-6.
35. S F. Polymer Composites with Improved Properties for Potential Stent Applications, in Biodegradable Polyesters. Wiley Weinheim, Germany; 2015. 299-320 p.
36. Wang Y, Kibbe M R, Ameer G A. Photo-crosslinked biodegradable elastomers for controlled nitric oxide delivery. Biomater Sci. 2013; 1(6):625.

The invention claimed is:

1. A composition comprising:
    (a) an acrylated or methacrylated citric-acid-based polymer;
    (b) a photoinitiator compound, wherein exposure to light of an appropriate wavelength results in formation of a first reactive species from the photoinitiator compound;
    (c) a thermal initiator compound, wherein exposure to heat results in in formation of a second reactive species from the thermal initiator compound;
    (d) a poly(L) lactic acid (PLLA); and
    (e) a contrast agent, wherein the contrast agent is radio-contrast agent.

2. The composition of claim 1, wherein the first reactive species and/or second reactive species is a free radical.

3. The composition of claim 1, wherein the appropriate wavelength of light is in the UV range.

4. The composition of claim 1, wherein exposure to heat comprises increasing temperature above a threshold temperature.

5. The composition of claim 1, wherein PLLA is dissolved in a solvent.

6. The composition of claim 1, wherein the contrast agent is iodixanol.

7. The composition of claim 6, further comprising a solvent.

8. The composition of claim 1, wherein the composition is a liquid.

9. The composition of claim 1, wherein the citric acid-based polymer comprises a polyester of citric acid and linear aliphatic diol monomers.

10. The composition of claim 9, wherein the citric acid-based polymer comprises a poly(diol citrate).

11. The composition of claim 10, wherein the diol is selected from the group consisting of 1,4-butanediol, 1,6-hexanediol, 1,8-octanediol, 1,10-decanediol, 1,12-dodecanediol, 1,14-quattuordecanediol, and 1,16-sedecimanediol.

12. The composition of claim 9, wherein at least 50% of the citric acid monomers of the acrylated or methacrylated polymer display a methacrylate or acrylate.

13. The composition of claim 1, wherein the photoinitiator comprises a compound selected from the group consisting of benzoyl peroxide, 2,2-Dimethoxy-2-phenylacetophenone (DMPA), camphorquinone (CQ), phenylbis(2,4,6-trimethylbenzoyl)phosphine oxide (BAPO), 2-Hydroxy-2-methylpropiophenone, ethyl 4-dimethylaminobenzoate (EDAB), and 2-hydroxy-4'-(2-hydroxyethoxy)-2-methylpropiophenone.

14. The composition of claim 1, wherein the thermal initiator compound is a diazo compound.

15. An object comprising a malleable solid material generated by photoinitiated 3D printing using the composition of claim 1 as an ink.

16. An object comprising a thermoset material generated by thermally-induced curing of the object of claim 15.

17. A method of promoting blood vessel regeneration at a defect site in a subject comprising:
    (a) placing at the defect site a malleable solid implant generated by photoinitiated 3D printing using the composition of claim 1 as an ink;
    (b) allowing the implant to undergo thermally-induced curing within the subject to form a thermoset implant at the defect site.

18. A method of stereolithographically printing a 3D object comprising:
    (a) depositing a layer of the composition of claim 1;
    (b) exposing the layer to light of the appropriate wavelength to form the first reactive species from the photoinitiator, wherein the first reactive species induces crosslinking of the acrylated or methacrylated polymer to form a malleable solid material;
    (c) depositing an additional layer of the composition of one of claim 1 atop the previous layer;
    (d) exposing the additional layer to light of the appropriate wavelength to form the first reactive species from the photoinitiator, wherein the first reactive species induces crosslinking of the acrylated or methacrylated polymer to form a malleable solid material; and
    (e) repeating steps (c) and (d) sufficient number of times to form the 3D object.

* * * * *